US012254405B2

(12) United States Patent
Hansen et al.

(10) Patent No.: US 12,254,405 B2
(45) Date of Patent: Mar. 18, 2025

(54) PROCESSING DATA IN PIXEL-TO-PIXEL NEURAL NETWORKS

(71) Applicant: QUALCOMM Incorporated, San Diego, CA (US)

(72) Inventors: David Hansen, Calgary (CA); Alireza Shoa Hassani Lashdan, Burlington (CA); Sivakumar Chidambaram, Markham (CA); Haoping Xu, North York (CA); Jeffrey Kar Fai Wong, Mississauga (CA); Stone Yun, Markham (CA); Darren Gnanapragasam, Aurora (CA)

(73) Assignee: QUALCOMM INCORPORATED, San Diego, CA (US)

( * ) Notice: Subject to any disclaimer, the term of this patent is extended or adjusted under 35 U.S.C. 154(b) by 1042 days.

(21) Appl. No.: 17/200,090

(22) Filed: Mar. 12, 2021

(65) Prior Publication Data

US 2022/0292344 A1    Sep. 15, 2022

(51) Int. Cl.
*G06N 3/08* (2023.01)
*G06F 18/21* (2023.01)
*G06V 10/82* (2022.01)

(52) U.S. Cl.
CPC .......... *G06N 3/08* (2013.01); *G06F 18/2163* (2023.01); *G06V 10/82* (2022.01)

(58) Field of Classification Search
CPC .......... G06N 3/08; G06N 3/045; G06N 3/063; G06F 18/2163; G06V 10/82
See application file for complete search history.

(56) References Cited

U.S. PATENT DOCUMENTS

2019/0340489 A1*  11/2019  Mills ................. G06F 7/523

OTHER PUBLICATIONS

A High Throughput CNN Accelerator, Tavakoli et al., 2020 (Year: 2020).*
Alwani, M., et al., "Fused-Layer CNN Accelerators," 49th Annual IEEE/ACM International Symposium on Microarchitecture (MICRO), Oct. 15, 2016 (Oct. 15, 2016), XP055573938, 12 Pages, DOI: 10.1109/MICRO.2016.7783725, [retrieved on Dec. 14, 2016], ISBN: 978-1-5090-3508-3, Section III, Figures 3, 4.

(Continued)

*Primary Examiner* — Jianxun Yang
(74) *Attorney, Agent, or Firm* — Polsinelli LLP

(57) ABSTRACT

Technologies are provided for processing data in neural networks. An example method can include processing, by each layer of a neural network, a row in a first stripe of a data input, the row being processed sequentially in a horizontal direction and according to a layer-by-layer sequence; after processing the row, processing, by each layer, subsequent rows in the first stripe on a row-by-row basis, each subsequent row being processed sequentially in the horizontal direction and according to the layer-by-layer sequence; generating an output stripe based on the processing of the row and subsequent rows; processing, by each layer, a second stripe of the data input, each row in the second stripe being processed in the horizontal direction and according to the layer-by-layer sequence, wherein rows in the second stripe are processed on a row-by-row basis; and generating another output stripe based on the processing of the second stripe.

30 Claims, 10 Drawing Sheets

(56) References Cited

OTHER PUBLICATIONS

International Search Report and Written Opinion—PCT/US2022/013891—ISA/EPO—May 13, 2022.
Tavakoli, M.R., et al., "A High Throughput Hardware CNN Accelerator Using a Novel Multi-Layer Convolution Processor", 2020 28th Iranian Conference on Electrical Engineering (ICEE) IIEEE, Aug. 4, 2020 (Aug. 4, 2020), XP033865830, pp. 1-6, DOI: 10.1109/ICEE50131.2020.9260785 [retrieved on Nov. 13, 2020] Sections III.B and IV.A, Figure 5.

* cited by examiner

PROCESSING DATA IN PIXEL-TO-PIXEL NEURAL NETWORKS

TECHNICAL FIELD

The present disclosure generally relates to neural networks. For example, aspects of the present disclosure relate to techniques and systems for processing data in neural networks.

BACKGROUND

Various devices and systems can implement processing engines and networks to process various types of data and generate specific outputs and/or effects. For example, some devices can implement neural networks to process images and/or videos and generate an output for consumption (e.g., for display on a device, for use by an application, etc.). The neural networks can effectively perform a variety of complex tasks with accurate results. The outputs and functionalities of the neural networks can also be used in a variety of applications such as, for example, computer graphics, extended reality (e.g., augmented reality, virtual reality, and the like), image recognition, data processing (e.g., image processing, video processing, etc.), data post-processing, visual rendering, television, among others.

Neural networks often process large amounts of data, such as video, image, and/or audio data, to perform certain tasks and generate specific outputs. The volume of data processed by neural networks and the processing demands of neural networks can place a significant burden on device resources such as memory, power and compute resources. Moreover, some neural network architectures can be more resource intensive than others and/or may need or utilize additional resources for their operations. This can further increase the neural network's resource and/or processing costs, reduce the neural network's efficiency, and/or otherwise increase the operational and resource burdens and requirements of the neural network.

BRIEF SUMMARY

In some examples, techniques and systems are described for increasing neural network efficiencies and reducing the resource and processing burdens and costs of neural networks. According to at least one illustrative example, a method of processing data in pixel-to-pixel neural networks is provided. In some examples, the method can include obtaining input data comprising stripes that logically segment the input data, each stripe of the input data including at least one row of data; processing, by each layer of a neural network, a row of data in a first stripe of the input data, wherein the row of data is processed sequentially in a horizontal direction and according to a layer-by-layer sequence where each preceding layer of the neural network processes a particular row of data before each subsequent layer of the neural network; after processing the row of data in the first stripe, processing, by each layer of the neural network, subsequent rows of data in the first stripe on a row-by-row basis, wherein each subsequent row of data is processed sequentially in the horizontal direction and according to the layer-by-layer sequence; generating, by the neural network, a first output stripe based on the processing of the row of data and the subsequent rows of data; after processing the first stripe, processing, by each layer of the neural network, rows of data in a second stripe of the input data on a row-by-row basis, wherein each row of data in the second stripe is processed in the horizontal direction and according to the layer-by-layer sequence; and generating a second output stripe based on the processing of the second stripe.

According to at least one illustrative example, a non-transitory computer-readable medium is provided for processing data in pixel-to-pixel neural networks. In some aspects, the non-transitory computer-readable medium can include instructions that, when executed by one or more processors, cause the one or more processors to obtain input data comprising stripes that logically segment the input data, each stripe of the input data including at least one row of data; process, by each layer of a neural network, a row of data in a first stripe of the input data, wherein the row of data is processed sequentially in a horizontal direction and according to a layer-by-layer sequence where each preceding layer of the neural network processes a particular row of data before each subsequent layer of the neural network; after processing the row of data in the first stripe, process, by each layer of the neural network, subsequent rows of data in the first stripe on a row-by-row basis, wherein each subsequent row of data is processed sequentially in the horizontal direction and according to the layer-by-layer sequence; generate, by the neural network, a first output stripe based on the processing of the row of data and the subsequent rows of data; after processing the first stripe, process, by each layer of the neural network, rows of data in a second stripe of the input data on a row-by-row basis, wherein each row of data in the second stripe is processed in the horizontal direction and according to the layer-by-layer sequence; and generate a second output stripe based on the processing of the second stripe.

According to at least one illustrative example, an apparatus is provided for processing data in pixel-to-pixel neural networks. In some aspects, the apparatus can include memory having stored thereon computer-readable instructions and one or more processors configured to obtain input data comprising stripes that logically segment the input data, each stripe of the input data including at least one row of data; process, by each layer of a neural network, a row of data in a first stripe of the input data, wherein the row of data is processed sequentially in a horizontal direction and according to a layer-by-layer sequence where each preceding layer of the neural network processes a particular row of data before each subsequent layer of the neural network; after processing the row of data in the first stripe, process, by each layer of the neural network, subsequent rows of data in the first stripe on a row-by-row basis, wherein each subsequent row of data is processed sequentially in the horizontal direction and according to the layer-by-layer sequence; generate, by the neural network, a first output stripe based on the processing of the row of data and the subsequent rows of data; after processing the first stripe, process, by each layer of the neural network, rows of data in a second stripe of the input data on a row-by-row basis, wherein each row of data in the second stripe is processed in the horizontal direction and according to the layer-by-layer sequence; and generate a second output stripe based on the processing of the second stripe.

According to another illustrative example, an apparatus for processing data in pixel-to-pixel neural networks can include means for obtaining input data comprising stripes that logically segment the input data, each stripe of the input data including at least one row of data; processing, by each layer of a neural network, a row of data in a first stripe of the input data, wherein the row of data is processed sequentially in a horizontal direction and according to a layer-by-layer sequence where each preceding layer of the neural network processes a particular row of data before each subsequent layer of the neural network; after processing the row of data in the first stripe, processing, by each layer of the neural network, subsequent rows of data in the first stripe on a row-by-row basis, wherein each subsequent row of data is processed sequentially in the horizontal direction and according to the layer-by-layer sequence; generating, by the neural network, a first output stripe based on the processing of the row of data and the subsequent rows of data; after processing the first stripe, processing, by each layer of the neural network, rows of data in a second stripe of the input data on a row-by-row basis, wherein each row of data in the second stripe is processed in the horizontal direction and according to the layer-by-layer sequence; and generating a second output stripe based on the processing of the second stripe.

In some aspects, the method, non-transitory computer-readable medium and apparatuses described above can store, in a first memory, an output generated by a previous layer of the neural network for one or more blocks in the row of data in the first stripe; and store, in a second memory associated with a particular layer of the neural network, one or more lines of data from the one or more blocks in the row of data. In some examples, the one or more lines of data can include a portion of a data input of the particular layer of the neural network on a previous stripe-block-row.

In some aspects, the method, non-transitory computer-readable medium and apparatuses described above can generate an input for the particular layer of the neural network based on a combination of the output generated by the previous layer and the one or more lines of data comprising the portion of the data input of the particular layer on the previous stripe-block-row; and generate, by the particular layer of the neural network, an additional output based on the output for the previous layer.

In some aspects, the method, non-transitory computer-readable medium and apparatuses described above can determine a portion of the input for the particular layer; and store the portion of the input in a third memory associated with the particular layer of the neural network.

In some aspects, the method, non-transitory computer-readable medium and apparatuses described above can generate an additional input for the subsequent layer of the neural network based on a combination of the additional output of the particular layer and the portion of the input for a subsequent layer from a previous stripe-block-row of the subsequent layer; and generate, by the subsequent layer of the neural network, a second additional output based on the additional input for the subsequent layer.

In some aspects, the method, non-transitory computer-readable medium and apparatuses described above can store the second additional output in fourth memory. In some examples, the second memory and the third memory can include line stores in a line store memory, and the first memory and the fourth memory can include buffers in scratch memory.

In some examples, processing the row of data in the first stripe sequentially in the horizontal direction can include sequentially processing, by each layer of the neural network, a plurality of blocks of data in the row. In some cases, each layer of the neural network processes each preceding block of data along a depth direction before processing a subsequent block along the horizontal direction.

In some examples, processing the subsequent rows can include sequentially processing, by each layer of the neural network, a respective plurality of blocks of data in each subsequent row. In some examples, each layer of the neural network processes preceding blocks of data in a subsequent row along the depth direction before processing subsequent blocks of data in the subsequent row.

In some examples, the neural network can include a pixel-to-pixel neural network, and the input data can include pixels associated with an image.

In some examples, obtaining the input data can include logically segmenting the input data into the stripes, wherein each stripe comprises a respective portion of the input data.

In some aspects, the method, non-transitory computer-readable medium and apparatuses described above can store, in a first memory associated with a particular layer of the neural network, outputs generated by a previous layer of the neural network for one or more blocks in each subsequent row of data; and store, in a second memory, one or more lines of data from the one or more blocks in each subsequent row of data. In some examples, the one or more lines of data can include one or more portions of one or more data inputs of the particular layer of the neural network.

In some aspects, the method, non-transitory computer-readable medium and apparatuses described above can generating inputs for the particular layer of the neural network based on combinations of the outputs generated by the previous layer and the one or more lines of data including the one or more portions of the one or more data inputs of the particular layer for a previous stripe-block-row; and generating, by the particular layer of the neural network, additional outputs based on the outputs from the previous layer and a subset of the inputs from the particular layer on the previous stripe-block-row.

In some aspects, the method, non-transitory computer-readable medium and apparatuses described above can determining portions of the inputs for the particular layer; storing the portions of the inputs in a third memory associated with a subsequent layer of the neural network; and storing the additional outputs in a fourth memory. In some cases, the second memory and the fourth memory can include memory buffers.

In some examples, processing the row of data can include processing, by each subsequent layer of the neural network, an output of a preceding layer of the neural network, the output corresponding to the row of data.

In some examples, processing the subsequent rows of data can include processing, by each subsequent layer of the neural network, an output of a preceding layer of the neural network, the output corresponding to a subsequent row of data in the first stripe.

In some aspects, an apparatus can be, or can be part of, a camera (e.g., an IP camera), a mobile device (e.g., a mobile telephone or so-called "smartphone," or other mobile device), a smart wearable device, an extended reality device (e.g., a virtual reality (VR) device, an augmented reality (AR) device, or a mixed reality (MR) device), a personal computer, a laptop computer, a server computer, a 3D scanner, a multi-camera system, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
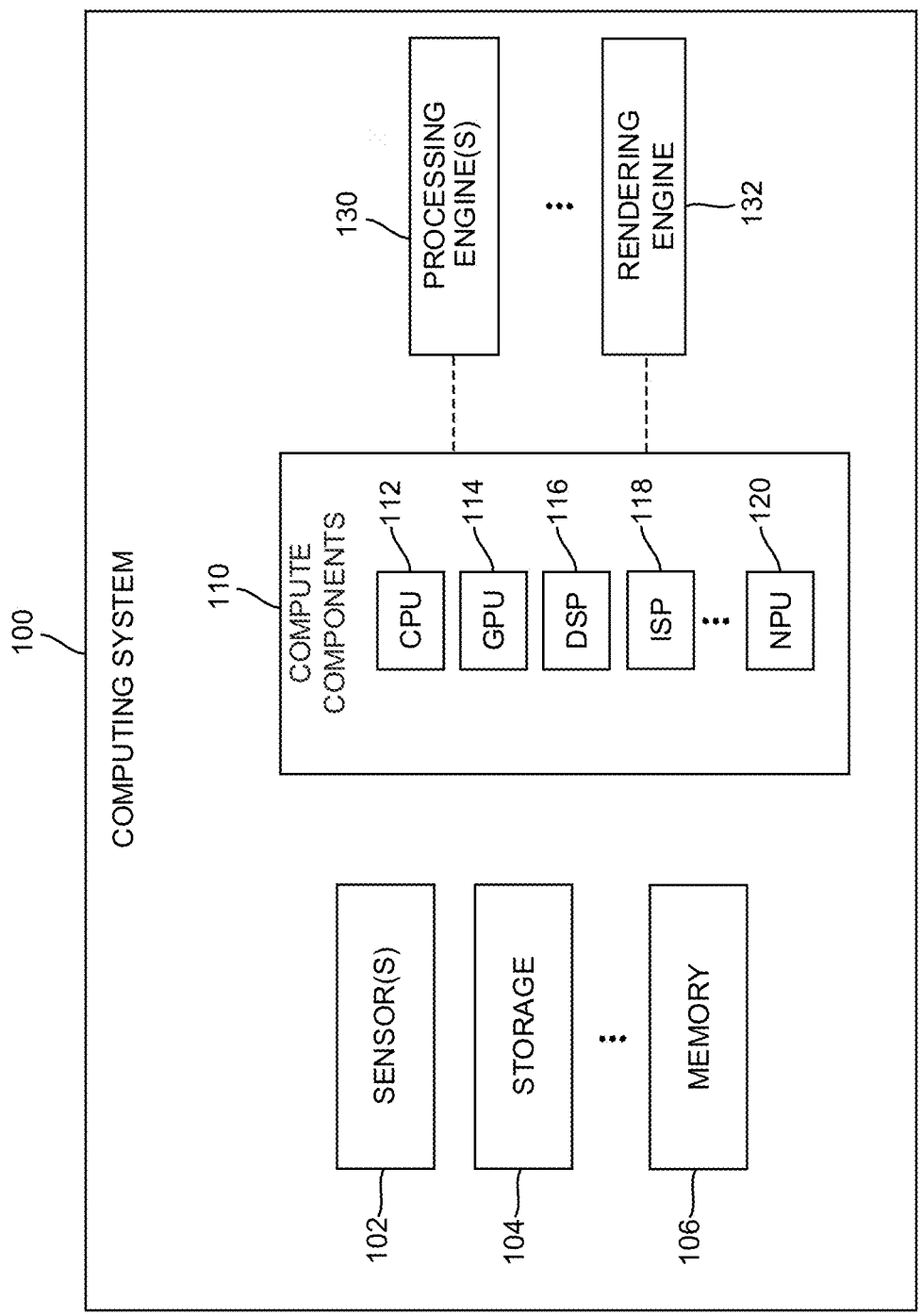
FIG. 1 is a simplified block diagram illustrating an example image processing system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As previously noted, neural networks can effectively perform a variety of complex tasks with accurate results. In many cases, the neural networks may process large amounts of data, such as video, image, and/or audio data, to perform certain tasks and generate specific outputs. The volume of data processed by neural networks and the processing demands of neural networks can place a significant burden on device resources such as memory, power and compute resources. Some neural network architectures can also be more resource intensive than others and/or may need or utilize additional resources for their operations. This can further increase the neural network's resource and/or processing costs, reduce the neural network's efficiency, and/or otherwise increase the operational and resource burdens and requirements of the neural network.

For example, pixel-to-pixel neural networks (and other networks that similarly process other types of data) generally use large memory buffers to temporarily store data processed by the pixel-to-pixel networks. However, the amount of data stored in memory buffers and/or the memory buffer requirements can grow significantly and even unsustainably as the size of the input data increases. This can result in increasing hardware costs and requirements. The resources at the device may limit the type, amount, and/or size of data that a pixel-to-pixel neural network can process. In many cases, even larger, more expensive memory buffers may not support some pixel-to-pixel neural network implementations and/or enable a pixel-to-pixel neural network to process certain types of data.

In some cases, the memory buffers used by pixel-to-pixel neural networks can become oversubscribed. This can result in an increased demand on other resources such as power and compute resources. For example, oversubscription of memory buffers used by a pixel-to-pixel neural network can cause the bandwidth, processor clock cycles, and power used by the pixel-to-pixel neural network to spike. The performance metrics at the device can significantly increase as the memory buffers are oversubscribed and/or the pixel-to-pixel neural networks are unable to store additional data in the memory buffers. In some cases, such a problem can be reduced or mitigated by increasing the amount and/or capabilities of the device's hardware resources. For example, the memory resources and capabilities at the device can be increased to handle higher volumes of data used by the pixel-to-pixel neural network. However, the amount of memory resources needed to process certain types of data and/or perform certain tasks can be expensive and even cost prohibitive.

As another example, a custom processor can be added at the device to handle some or all of the operations of the pixel-to-pixel neural network. While the custom processor can increase the processing capabilities at the device and support additional processing demands of the pixel-to-pixel neural network, the pixel-to-pixel neural network may still require large amounts of memory to process the data. However, the memory resources needed to support such large amounts of memory can be cost prohibitive and/or otherwise hinder the implementation of custom processors to address the memory requirements of the pixel-to-pixel neural network. The memory and resource problems with pixel-to-pixel neural networks can be exacerbated in lower-end device implementations.

For example, in lower-end devices, the amount of memory resources used by the pixel-to-pixel neural network are more limited. In many cases, the size of the memory buffers used by the pixel-to-pixel neural network may need to be reduced. Generally, the memory systems or subsystems for transferring data to and/or from the memory buffers may similarly need to be reduced. However, the reduction in memory buffers can cause a spike in bandwidth requirements, as previously explained. This can be further exacerbated by the reduction in the memory systems or subsystems which can also decrease the amount of available bandwidth at the device. The lower-end devices are thus disproportionately impacted by the reduction in memory and bandwidth.

In some aspects, systems, apparatuses, processes (also referred to as methods), and computer-readable media (collectively referred to herein as "systems and techniques") are described herein for efficiently processing data and reducing resource burdens in neural networks such as pixel-to-pixel neural networks and any other neural networks that process large two-dimensional (2D) inputs (and/or three-dimensional (3D) inputs) to large or larger 2D outputs (and/or 3D outputs). The systems and techniques described herein can increase neural network efficiencies while reducing resource and processing burdens and costs of neural networks. In some examples, the systems and techniques can provide an architecture that implements a stripe and raster based data processing scheme that allows a neural network to process and/or stream higher amounts of data between neural network layers and reduces the amount of data stored in memory during the operation of the neural network. The systems and techniques described herein can reduce the amount of overlapping and/or redundant data processed by the neural network.

Examples of the systems and techniques described herein for processing data are illustrated in FIG. 1 through FIG. 9 and described below. FIG. 1 is a diagram illustrating an example computing system 100. The computing system 100 can perform implement neural networks for processing data. The neural networks can implement architectures and data processing schemes for increasing processing efficiencies and/or reducing resource requirements, as described herein. The computing system 100 and/or neural networks can perform various tasks and operations such as, for example, tasks and operations for extended reality, image/video processing and/or post-processing, data processing and/or post-processing, computer graphics, automation, machine vision, object modeling and registration, multimedia rendering and/or composition, and/or any other data processing tasks, effects, and/or computations.

In some illustrative examples, the computing system 100 implement one or more pixel-to-pixel neural networks and perform a stripe and raster based processing scheme and architecture as further described herein. In some examples, the pixel-to-pixel neural networks can receive pixel inputs and generate pixel outputs. While various examples in the disclosure are described with respect to pixel-to-pixel neural networks, the systems and techniques described herein can be implemented with and/or for other types and/or architectures of neural networks. For example, the systems and techniques described herein can be implemented for any neural network that processes large 2D data inputs to large or larger 2D data outputs, or any large 3D data inputs to large or larger 3D data outputs. The pixel-to-pixel neural network examples herein are non-limiting examples provided for illustration and explanation purposes.

In the example shown in FIG. 1, the computing system 100 includes one or more sensors 102, a storage 104, memory 106, computing components 110, a processing engine 130, and a rendering engine 132. The computing system 100 can be part of a computing device or multiple computing devices. In some examples, the computing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a digital media player, a gaming console, a video streaming device, a drone, a computer in a car, a system-on-chip (SoC), an Internet-of-Things (IoT) device, or any other suitable electronic device(s).

In some implementations, the one or more sensors 102, storage 104, memory 106, computing components 110, the processing engine 130, and the rendering engine 132 can be part of the same computing device. For example, in some cases, the one or more sensors 102, storage 104, memory 106, computing components 110, the processing engine 130, and the rendering engine 132 can be integrated into a smartphone, laptop, tablet computer, smart wearable device, gaming system, server, SoC, and/or any other computing device. In other implementations, any of the one or more sensors 102, storage 104, memory 106, computing components 110, the processing engine 130, and/or the rendering engine 132 can be part of two or more separate computing devices.

The one or more sensors 102 can include one or more image sensors, radar sensors, light detection and ranging (LIDAR) sensors, infrared (IR) sensors, gyroscopes, accelerometers, inertial measuring units (IMUs), audio sensors, and/or any other sensor. In some examples, the one or more sensors 102 can include one or more image sensors. The one or more image sensors can include image sensors and/or image capturing devices capable of capturing images. For example, the one or more image sensors can include one or more sensors capable of capturing red-green-blue (RGB) images. In some examples, an image (or frame) can include a red-green-blue (RGB) image or frame having red, green, and blue color components per pixel; a luma, chroma-red, chroma-blue (YCbCr) image or frame having a luma component and two chroma (color) components (chroma-red and chroma-blue) per pixel; or any other suitable type of color or monochrome picture.

In some cases, the one or more image sensors can be any type of image sensor (or image capture devices) and/or video sensor (or video capture devices). For instance, the one or more image sensors can include digital camera sensors, video camera sensors, smartphone camera sensors, image/video capture devices included as part of an electronic apparatus (e.g., a television, a computer, a camera, etc.). In some cases, the one or more image sensors can be part of a camera or computing device, such as a digital camera, a video camera, an IP camera, a smartphone, a smart television, a game system, a scanner, a multi-camera system, or other computing device. For example, the one or more image sensors can be part of a dual-camera system or device, such as a smartphone, a camera, etc. The one or more image sensors can capture image data and/or video content (e.g., raw image and/or video data). The image data and/or video content can be processed by the computing components 110, the processing engine 130, and/or the rendering engine 132 as described herein.

The storage 104 can be any storage device(s) for storing data, such as image, audio, file, or video data for example. Moreover, the storage 104 can store data from any of the components of the computing system 100. For example, the storage 104 can store data or measurements from the one or more sensors 102, the computing components 110 (e.g., parameters, inputs, outputs, generated images, calculation results, models, etc.), and/or data from any of the processing engine 130 and/or the rendering engine 132 (e.g., output images, processing results, models, etc.). In some examples, the storage 104 can include a buffer for storing data (e.g., image data) for processing by the computing components 110. The memory 106 can include any memory device for storing data, such as random-access memory (RAM), read-only memory (ROM), cache, memory buffers, etc.

In some implementations, the computing components 110 can include a central processing unit (CPU) 112, a graphics processing unit (GPU) 114, a digital signal processor (DSP) 116, an image signal processor (ISP) 118 and/or a neural processing unit (NPU) 120. In some examples, the computing components 110 can include one or more memories, such as cache and/or memory buffers. The computing components 110 can perform various operations such as data processing, computer vision, graphics rendering, extended reality (e.g., virtual reality, augmented reality, etc.), image/video processing, sensor processing, recognition (e.g., text recognition, object recognition, feature recognition, face recognition, facial expression recognition, eye gaze recognition, age recognition, gender recognition, race recognition, tracking or pattern recognition, scene change recognition, etc.), machine learning, filtering, automation, computer graphics, and any of the various operations described herein. In some examples, the computing components 110 can implement the processing engine 130 and the rendering engine 132. In other examples, the computing components 110 can also implement one or more other processing engines.

The operations for the processing engine 130 and the rendering engine 132 can be implemented by one or more of the computing components 110. In one illustrative example, the processing engine 130 (and associated operations) can be implemented by the CPU 112, the DSP 116, the ISP 118, and/or the NPU 120, and the rendering engine 132 (and associated operations) can be implemented by the GPU 114. In some cases, the computing components 110 can include other electronic circuits or hardware, computer software, firmware, or any combination thereof, to perform any of the various operations described herein.

The computing components 110 can implement the processing engine 130 to perform various processing operations, such as image/video processing, XR rendering, computer vision, data processing, computer modeling, gaming, computer graphics, etc. The processing engine 130 can implement a neural network(s) and processing architecture and/or scheme, as further described herein. For example, the processing engine 130 can implement a pixel-to-pixel neural network and a stripe and raster based processing scheme as described herein. In some examples, the processing engine 130 can be implemented by the NPU 120 to perform various tasks using the stripe and raster based processing pattern described herein.

While the computing system 100 is shown to include certain components, one of ordinary skill will appreciate that the computing system 100 can include more or fewer components than those shown in FIG. 1. For example, the computing system 100 can also include, in some instances, one or more additional memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the computing system 100 is described below with respect to FIG. 9.

As previously noted, certain neural network architectures, such as pixel-to-pixel neural network architectures, use or require large memory buffers to process data. The memory buffer size can grow unsustainably as the size of the input data increases. Even large memory buffers may not be sufficient for certain data processing cases. As the memory buffers become oversubscribed and/or full, other resource requirements and/or utilization can increase substantially. For example, as memory buffers become oversubscribed, bandwidth, power, clock cycles, etc., also increase substantially. Adding more memory buffers and/or memory buffers with higher capacities can be expensive and may not sufficiently prevent and/or mitigate memory buffer oversubscription and/or increases in other resource requirements and/or utilization. The cost of large memory buffers can also prevent addition of other hardware resources, such as custom processors, to address such resource needs and/or limitations.

The systems and techniques described herein provide an architecture and data processing scheme to address these and other challenges/limitations. The architecture and data processing scheme can be used to process any type of data, such as image data, video data, audio data, files, etc. For explanation and illustration purposes, the architecture and data processing scheme will be describe with respect to processing image data.

In some examples, the systems and techniques described herein can provide a stripe and raster based processing scheme. The stripe and raster based processing scheme can divide a neural network's input into vertical stripes that the neural network processes according to specific patterns as described below. Each layer of the neural network can process data in a stripe along depth and horizontal directions before moving in a vertical direction to process additional data. The additional data can be similarly processed along depth and horizontal directions before again moving in a vertical direction to process new data.

Figure 2:
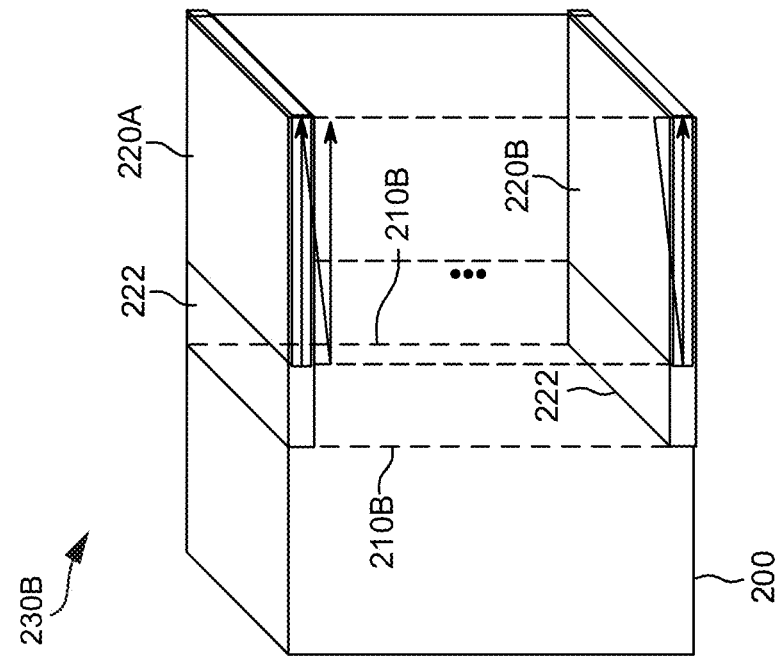
FIG. 2 is a diagram illustrating an example input for a pixel-to-pixel neural network implementing a stripe and raster based processing scheme, in accordance with some examples of the present disclosure.
Figure 2:
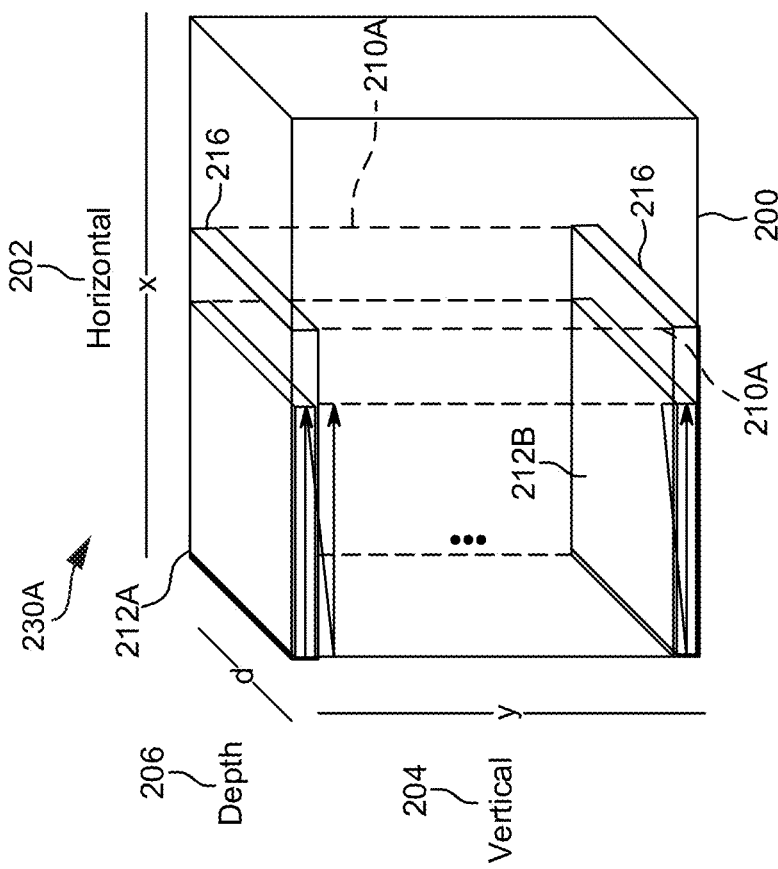

FIG. 2 is a diagram illustrating an example input 200 for a pixel-to-pixel neural network implementing a stripe and raster based processing scheme. The input 200 can include, for example, an image, an audio file, 2D data, 3D data, and/or any other type of data. In this example, the input 200 represents an image being processed by a pixel-to-pixel neural network, such as a pixel-to-pixel convolution neural network. The input 200 includes stripe 210A and stripe 210B, as further described herein.

In FIG. 2, the input 200 is shown in a left diagram 230A and a right diagram 230B illustrating the stripe 210A and the stripe 210B at different positions within the input 200. The left diagram 230A shows the stripe 210A at a left portion of the input 200 during a first processing time and the right diagram 230B shows the stripe 210B at a right portion of the input 200 during a second processing time. 210A210B The input 200 is shown divided in diagrams 230A and 230B to illustrate the different stripes 210A210A and 210B210B within the input 200 at different times. While the example of FIG. 2 illustrates two stripes, in other examples, the input 200 can include more or less stripes than shown in FIG. 2. In some examples, the number of stripes in the input 200 can vary or depend on the neural network processing requirements and/or architecture.

The stripes 210A and 210B can each include a number of stripe blocks extending vertically from the top of the input 200 to the bottom of the input 200. For example, FIG. 2 illustrates a stripe block 210AA at the top of stripe 210A and a stripe block 210AB at the bottom of the stripe 210A, and stripe block 220A at the top of stripe 210B and stripe block 220B at the bottom of the stripe 210B. Each of these stripe blocks can represent a row (or layer) of the stripes 210A and 210B. While not shown in FIG. 2 for simplicity, the stripe 210A can include additional stripe blocks extending from stripe block 212A to stripe block 212B such that the stripe 210A includes rows (or layers) of stripe blocks from top to bottom. Similarly, while not shown in FIG. 2 for simplicity, the stripe 210B can include additional stripe blocks extending from stripe block 220A to stripe block 220B such that the stripe 210B includes rows (or layers) of stripe blocks from top to bottom.

The input 200 and the stripes 210A and 210B can include a horizontal dimension 202 (e.g., along an x axis), a vertical dimension 204 (e.g., along a y axis), and a depth dimension 206 (e.g., along a z axis). Each layer of a neural network can process data in a stride along the depth dimension 206 and the horizontal dimension 202 before processing data along the vertical dimension 204.

The stripe 210A can include overlap regions 216 and the stripe 210B can include overlap regions 222. The overlap regions 216 and 222 can include an amount of overlap in inputs processed by the neural network. As shown, the overlap in the overlap regions 216 and 222 is in the horizontal dimension 202. Any overlaps in the vertical dimension 204 can be stored in memory for use as needed by the neural network. In some cases, the overlaps can result in a certain amount of extra and/or redundant compute. However, the configuration of the stripes 210A and 210B and the data processing scheme described herein can avoid overlaps in other directions. Accordingly, the overlaps in the input 200 can be less than the amount of overlaps in other data processing schemes and architectures, and can result in less extra and/or redundant compute.

For example, the configuration of the stripes 210A and 210B and the data processing scheme described herein can avoid overlaps in at least one side of a stripe block (e.g., stripe block 212A, stripe block 212B, stripe block 220A, stripe block 220B) along the horizontal dimension 202, at least one side along the vertical dimension 204, and one or both sides along the depth dimension 206. This can significantly reduce the memory and processing requirements and/or burdens of the neural network. Moreover, by only including a small amount of overlap along one side of the horizontal dimension 202 (relative to a stripe block) during processing and storing any amount of overlap that may exist along one side of the vertical dimension 204 (relative to a stripe block), the memory and processing requirements and/or burdens of the neural network can be further reduced.

Figure 3:
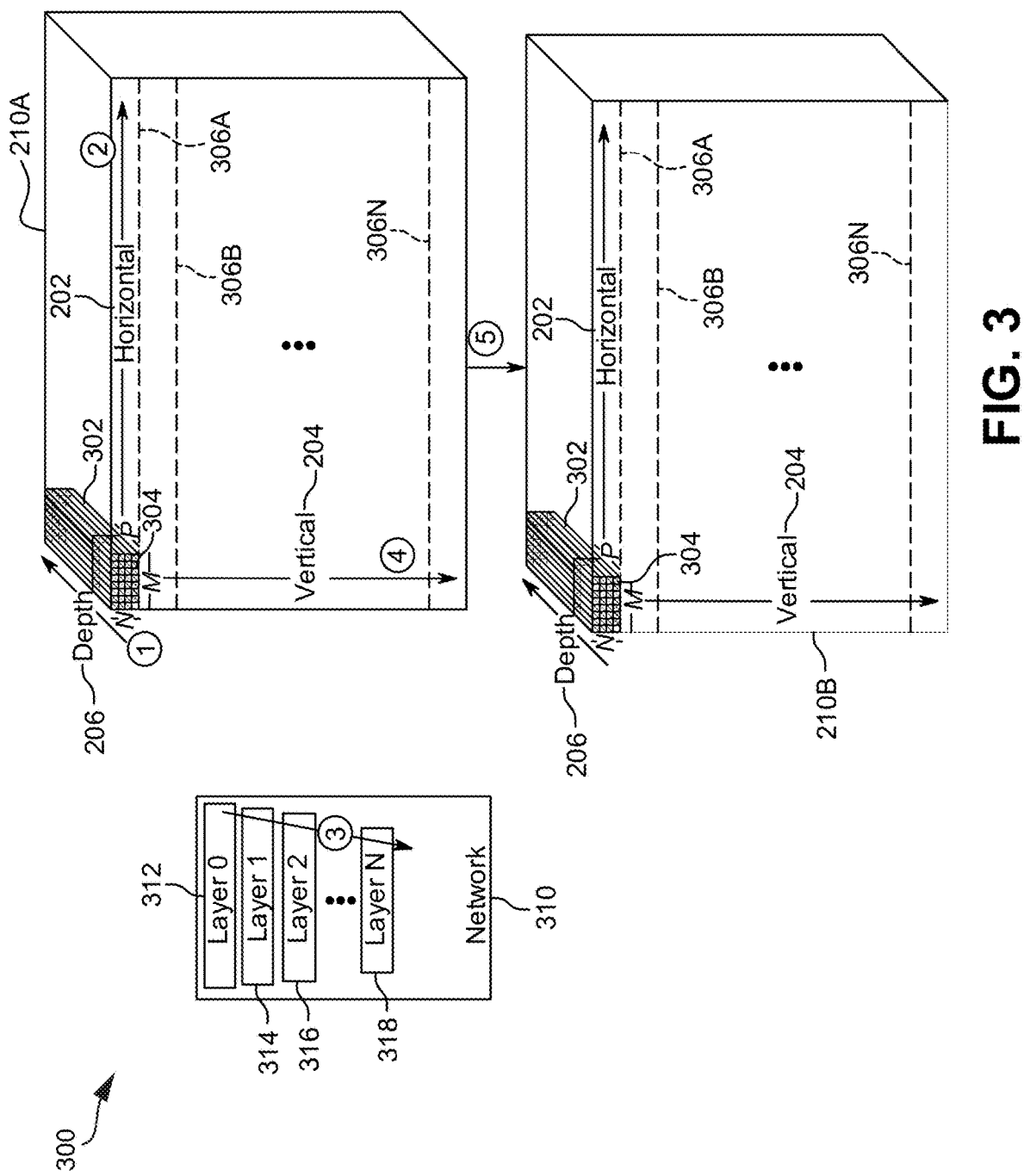
FIG. 3 is a diagram illustrating an example data processing scheme for a neural network, in accordance with some examples of the present disclosure.

FIG. 3 is a diagram illustrating an example data processing scheme 300 for a neural network 310. The data processing scheme 300 can include a stripe-raster data processing order or pattern. The neural network 310 can implement the data processing scheme 300 to process data in the stripes 210A and 210B. The neural network 310 can include multiple layers (e.g., layers 312 through 318) for processing input data and generating an output.

The neural network 310 can include any neural network that takes a large n-dimensional input and generates a large or larger large n-dimensional output. For example, in some cases, the neural network 310 can include a pixel-to-pixel neural network. The pixel-to-pixel neural network can process input pixels from an image and generate output pixels for the image. In some examples, the image can be a large and/or high resolution image. The image can be a 2D image or a 3D image, for example. In other cases, the neural network 310 can include a 2D input to 2D output neural network. For example, the neural network 310 can generate a 2D output from a 2D input. In some examples, the neural network 310 can process and/or transform each portion of 2D data and generate a 2D data output for each portion of 2D data. The 2D input and the 2D output can include for example, an image, video data, audio data, or any other 2D data.

In yet other cases, the neural network 310 can include a 3D input to 3D output neural network. For example, the neural network 310 can generate a 3D output from a 3D input. In some examples, the neural network 310 can process and/or transform each portion of 3D data and generate a 3D data output for each portion of 3D data. The 3D input and the 3D output can include for example, an image, video data, audio data, or any other 3D data.

In FIG. 3, the stripe 210A and the stripe 210B include block rows 306A-N for processing data in stripe blocks 302 according to the data processing scheme 300. The stripe blocks 302 can include tiles 304 (or sub-blocks) of data which are first processed along a depth dimension 206 of the stripe block 302 before shifting the stripe blocks 302 along a horizontal dimension 202 to process data in the tiles 304 along the depth dimension 206 of the stripe blocks 302 shifted in the horizontal dimension 202. The tiles 304 can continue to be processed along the depth dimension 206 of the stripe blocks 302 and the stripe blocks 302 can continue to be processed along the horizontal dimension 202 (e.g., across the corresponding block row). Once all of the layers 312 through 318 have processed the data across a block row, the processing scheme 300 can move in the vertical dimension 204 to similarly process the data in the next row of the stripe.

Each layer in the neural network 310 (e.g., each of layers 312 through 318) can process data in a stripe block 302 (and row) according to the pattern described above before the next layer in the neural network 310 processes the data in the stripe block 302 (and row) according to the same processing order/pattern. For example, each layer in the neural network 310 can process data in a stripe block 302 in row 306A along the depth dimension 206 of the stripe block 302 followed by the horizontal dimension 202 of the row 306A, before a next layer of the neural network processes the data in the stripe block 302 in a similar pattern.

To illustrate, layer 312 (e.g., layer 0) of the neural network 310 can first process the tile 304 of the stripe block 302 in row 306A of stripe 210A along the depth dimension 206 of the stripe block 302. Once the layer 312 has processed the data in the stripe block 302 in row 306A, the layer 312 can move along the horizontal dimension 202 and process data in an adjacent stripe block in the row 306A. The layer 312 can process a tile in the adjacent stripe block along the depth dimension 206 before the layer 312 again moves along the horizontal dimension 202 of the row 306A to a next adjacent stripe block. The layer 312 can continue processing data in this pattern until it finishes processing the data in the row 306A. Once the layer 312 completes processing the data in the row 306A, the next layer, layer 314 (e.g., layer 1), in the neural network 310 can process the data in the row 306A according to the same pattern. For example, layer 314 can sequentially process data in a stripe block along the depth dimension and can sequentially process blocks in the row 306A along the horizontal dimension 202. Once layer 314 completes processing the data in the row 306A, the next layer, layer 316 (e.g., layer 2) in the neural network 310 can process the data in the row 306A according to the same pattern. Once layer 314 completes processing the data in the row 306A, the next layer, layer 318 (e.g., layer N), in the neural network 310 can process the data in the row 306A according to the same pattern.

In this way, each layer in the neural network 310 can sequentially process the data in the row 306A according to the pattern described above, before moving in the vertical dimension 204 of the stripe 210A to similarly process (e.g., according to the same pattern) the data in the next row, row 306B. Once all the layers in the neural network 310 complete processing the data in row 306B, the neural network 310 can move in the vertical dimension 204 of the stripe 210A and each layer in the neural network 310 can similarly process the data in the next row of the stripe 210A. The neural network 310 can continue moving along the vertical dimension 204 until the data in the last row (e.g., row 306N) of the stripe 210A has been processed by each layer.

Once the stripe 210A has been processed, the neural network 310 can process the next stripe, stripe 210B. The neural network 310 can process stripe 210B according to the order/pattern described above with respect to stripe 210A, until it completes processing all of the data in the stripe 210B. As previously explained, the input data can include more or less stripes than shown in FIGS. 2 and 3. Accordingly, if the input data includes additional stripes, the neural network 310 can proceed to a next stripe and process the data in the next stripe as previously explained. The neural network 310 can continue to process any additional stripes until all stripes have been processed.

Each stripe (e.g., stripes 210A and 210B) can include any number of rows. Moreover, the sizes of a stripe block (e.g., stripe block 302) and a tile (e.g., tile 304) are not limited to any particular sizes and can vary in different implementations. In some examples, the sizes of a stripe block and/or a tile can be based on a preference, a neural network architecture, a datapath architecture, neural network requirements, the type and/or attributes of the input, the size and/or number of stripes, and/or any other factor. For example, in some cases, the sizes of a stripe block and/or a tile can be based on a multiply-accumulate (MAC) datapath architecture.

In some examples, the data processing scheme 300 can include an inner processing loop and an outer processing loop. The inner processing loop can process data in a stripe block according to a pattern as previously described. In some examples, the inner processing loop can process horizontal blocks (or sub-tiles) within a stripe block sequentially or in parallel, vertical blocks (or sub-tiles) within the stripe block sequentially or in parallel, a tile output depth sequentially or in parallel, and an input depth sequentially or in parallel. In one illustrative example, the horizontal blocks, vertical blocks, and tile output depth can be "unrolled" (e.g., processed and/or output in parallel), and the input depth can be "walked" (e.g., sequentially processed and/or output).

The outer loop can process input data in a particular order as previously described. For example, the outer loop can process data by a depth direction, followed by a horizontal direction, followed by a neural network layer order, followed by a vertical direction, and followed by a stripe order. For example, a first layer of the neural network can first process data in a stripe block along a depth dimension of the stripe block. The first layer of the neural network can then move in a horizontal direction to a next stripe block and similarly process the data in the next stripe block. The first layer of the neural network can continue to move in the horizontal direction and process data in each stripe block along the horizontal direction until all stripe blocks in a row have been processed. A second layer of the neural network can then perform the same pattern to process the stripe blocks in the row. Each subsequent layer in the neural network can similarly perform the same pattern until all layers have processed the stripe blocks in the row. Once all the layers have processed the stripe blocks in the row, the first layer of the neural network can move in a vertical direction along the stripe to similarly process the stripe blocks in a next row. Each layer of the neural network can sequentially process the stripe blocks in the next row, and the neural network can continue moving in the vertical direction until all layers have processed the stripe blocks in all rows. The neural network can then proceed with any subsequent stripes, and sequentially process the subsequent stripes according to the outer loop order described above.

Figure 4:
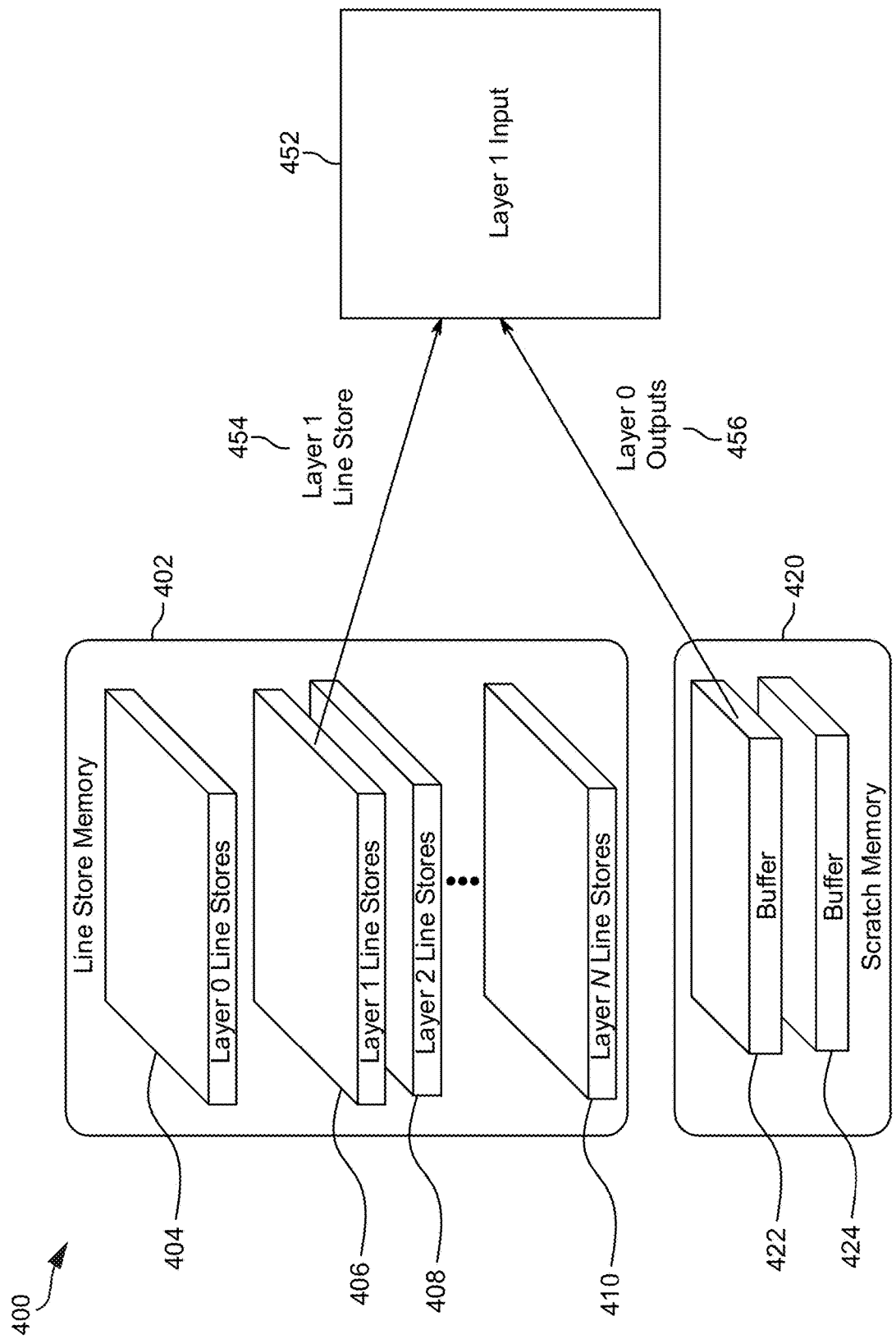
FIG. 4 is a diagram illustrating an example memory architecture for storing stripe data for generating layer inputs, in accordance with some examples of the present disclosure.

FIG. 4 is a diagram illustrating an example memory architecture 400 for storing stripe data for generating layer inputs. In this example, the memory architecture 400 includes a line store memory 402 and a scratch memory 420. In some examples, the line store memory 402 and the scratch memory 420 can include one or more random access memories.

The scratch memory 420 can store outputs from layers (e.g., layers 312 through 318) of the neural network 310. For example, buffer 422 in the scratch memory 420 can store the output from layer 0 (e.g., layer 312) and buffer 424 in the scratch memory 420 can store the output from layer 1 (e.g., layer 314). As additional layers of the neural network generate outputs, their outputs can be similarly stored in the scratch memory 420. The output from a layer in the neural network can be used as the input for a next layer in the neural network. In some examples, the scratch memory 420 can include a buffer for each output of each layer of the neural network 310. In some cases, the buffers in the scratch memory (e.g., buffers 422 and 424) can include ping pong buffers.

The line store memory 402 can store portions of data (e.g., lines of data, a blocks of data, windows of data, subsets of data rows of stripe blocks, etc.) from the layers in the neural network 310. The data stored in the line store memory 402 can include overlapping data (e.g., overlap regions 216 and 222) of two or more layers of the neural network 310. In some examples, the line store memory 402 can include line stores 404 through 410. Each line store can correspond to a respective layer of the neural network 310, and the data in a line store can be used as part of the input for the layer associated with that line store. In this example, line store 404 can correspond to layer 0 (e.g., layer 312) of the neural network 310, line store 406 can correspond to layer 1 (e.g., layer 314) of the neural network 310, line store 408 can correspond to layer 2 (e.g., layer 316) of the neural network 310, and line store 410 can correspond to layer N (e.g., layer 318) of the neural network 310. The data stored in a line store associated with a layer of the neural network can include a subset of the data (e.g., one or more lines, one or more data blocks, an input window, subsets of data rows of a stripe block, etc.) from a previous layer of the neural network 310.

For example, line store 406 corresponding to layer 1 (e.g., layer 314) of the neural network 310 can include a subset of the output data from layer 0 (e.g., layer 312) of the neural network 310. In some cases, the size of the data stored can be based on a size of a convolutional filter implemented by the neural network 310. For example, the convolutional filters can cause a slight shift in the output data from each layer. Since a layer uses the output from a previous layer as part of its input, the shift in the output data can reduce the size of the input to that layer. The portion of the data from the previous layer stored in a line store (e.g., the overlap) can thus be used as part of the input to the next layer to increase the size of the input to that next layer. To illustrate, the convolutional filters implemented by the layers of the neural network 310 can cause downscaling of the output data. Thus, the downscaled output from a layer may need to be increased to formulate the input to the next layer.

As previously noted, line store 406 corresponding to layer 1 (e.g., layer 314) of the neural network 310 can include a subset of the output data from layer 0 (e.g., layer 312) of the neural network 310. Similarly, line store 408 corresponding to layer 2 (e.g., layer 316) of the neural network 310 can include a subset of the output data from layer 1 (e.g., layer 314) of the neural network 310, and line store 410 corresponding to layer N (e.g., layer 318) of the neural network 310 can include a subset of the output data from layer 2 (e.g., layer 316) of the neural network 310. In some examples, since layer 0 is the first layer and does not have data from a previous layer, the data stored in the line store 404 corresponding to layer 0 can include padding. The padding can include, for example, an edge replication (e.g., repeating the first one or more input lines), a value replication, and/or any other padding technique and/or data.

In some examples, the overlapping data from one layer of the neural network 310 can include a portion of vertical overlap from the data processing scheme 300. For example, as previously explained, the data processing scheme 300 can include an overlap (e.g., overlap regions 216 and 222) in the horizontal direction. In some cases, the overlap in the horizontal direction can be processed by each layer of the neural network 310 when each layer processes the data in a row (e.g., row 306A, 306B, 306N) of a stripe. An additional overlap in a downward vertical direction can be stored in the line store memory 402 for use when processing a next row in the stripe. In some cases, this vertical overlap can include the overlap data described above with respect to the line stores 404 through 410. For example, the overlap data can include a portion of data in the vertical direction from a previous row of the stripe processed by the neural network 310.

The memory architecture 400 can use the outputs stored in the scratch memory 420 and the overlap data in the line store memory 402 to prepare and process layer data. For example, in FIG. 4, the output 456 of layer 0 of the neural network 310 is stored in buffer 422 and the overlap data 454 from layer 0 of the neural network 310 is stored in the line store 406. To formulate the input 452 for layer 1, the output 456 of layer 0 from the buffer 422 can be combined with the overlap data 454 from the line store 406. The combination of the output 456 of layer 0 and the overlap data 454 can produce the input 452 for layer 1.

As shown, the memory architecture 400 can combine data from the two memories (e.g., the line store memory 402 and the scratch memory 420) on a layer-by-layer basis to form the input data for any given layer. In some cases, layers are processed serially without needing to fetch data from the system memory.

In some examples, the line store memory 402 can store m number of lines of input data per neural network layer. For example, line store 404 can store m lines of input data for layer 0, line store 406 can store m lines of input data for layer 1, line store 408 can store m lines of input data for layer 2, and line store 410 can store m lines of input data for layer N. In some cases, the m number of lines can depend on the kernel size of the associated neural network layer.

Each buffer in the scratch memory 420 can store an output of a particular neural network layer. In some cases, the output of a particular neural network layer stored in a buffer can include n number of lines of data. For example, buffer 422 can store an output of layer 0 including n lines of data, and buffer 424 can store an output of layer 1 including n lines of data.

In some cases, the n lines of data can be passed from layer to layer. In some examples, the n number of lines can vary in different examples and/or can depend on the architecture used. In some cases, increasing the number n of lines can allow for greater MAC parallelism. For example, if a MAC engine is 1024 MAC/cycle, the MAC engine may process a number of lines concurrently (e.g., n number of lines), a numbers of pixels (or other types of data) concurrently as well as a number of input depth and output depth concurrently. In some cases, these parameters can combine to form an inner loop tile size.

Figure 5A:
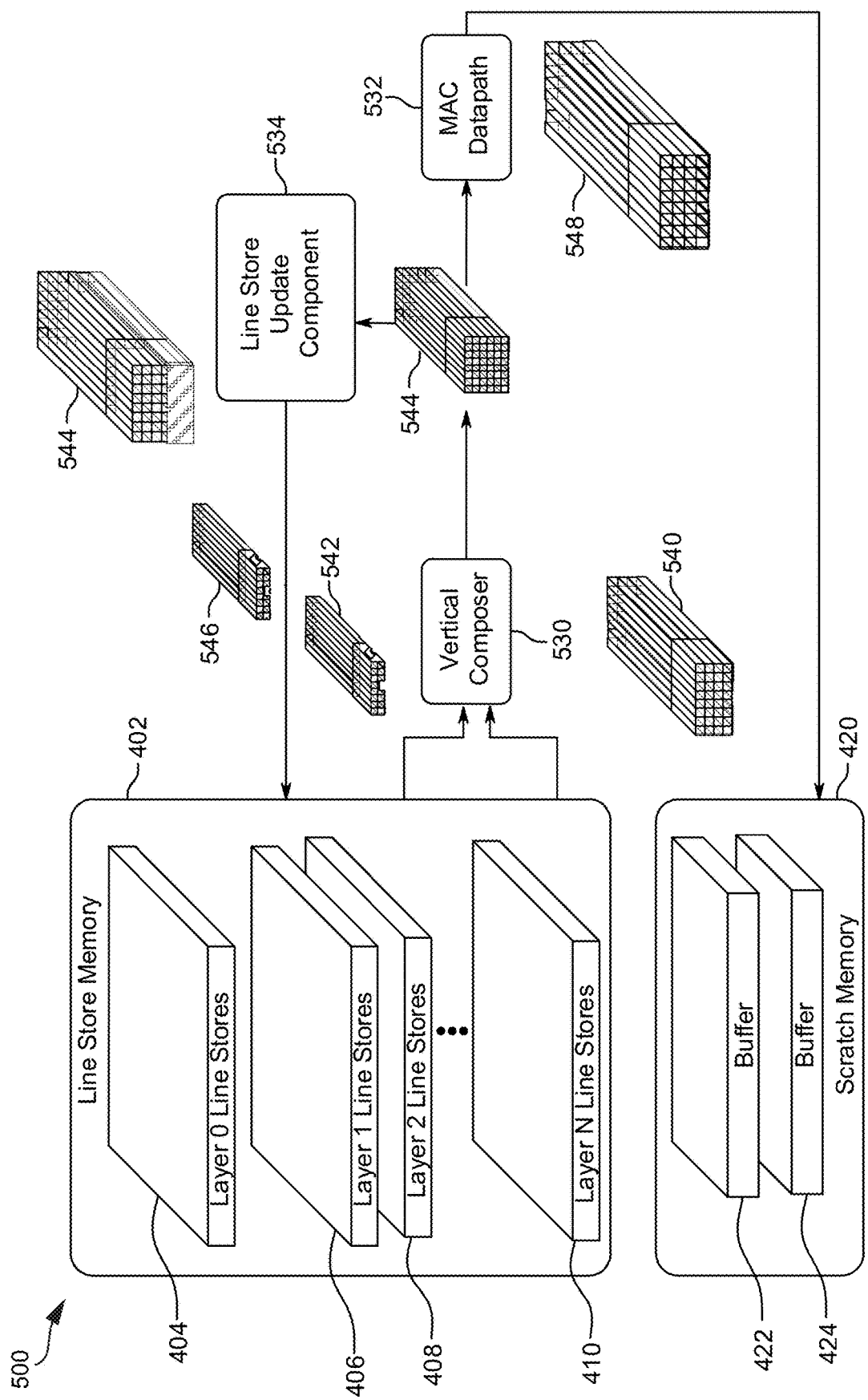
FIGS. 5A and 5B are diagrams illustrating example data processing architectures for generating neural network layer inputs and outputs, in accordance with some examples of the present disclosure.

FIG. 5A is a diagram illustrating an example data processing architecture 500 for generating neural network layer inputs and outputs. The data processing architecture 500 includes the line store memory 402 and a scratch memory 420. As previously explained, the scratch memory 420 can store outputs from layers (e.g., layers 312 through 318) of the neural network 310. For example, buffer 422 in the scratch memory 420 can store the output from layer 0 (e.g., layer 312) and buffer 424 in the scratch memory 420 can store the output from layer 1 (e.g., layer 314). As additional layers of the neural network generate outputs, their outputs can be similarly stored in the scratch memory 420. The output from a layer in the neural network can be used as the input for a next layer in the neural network. In some examples, the scratch memory 420 can include as many buffers as one for each output of each layer of the neural network 310. In other examples, the scratch memory 420 can include as few buffers as two and a half block-row-layer outputs The line store memory 402 can store portions of data (e.g., lines of data, a blocks of data, windows of data, subsets of data rows of stripe blocks, etc.) from the layers in the neural network 310. The data stored in the line store memory 402 can include overlapping data (e.g., overlap regions 216 and 222) of two or more layers of the neural network 310. In some examples, the overlapping data from one layer of the neural network 310 can include a portion of vertical overlap from the data processing scheme 300.

The data processing architecture 500 can use the outputs stored in the scratch memory 420 and the overlap data in the line store memory 402 to prepare and process layer data. For example, in FIG. 5A, the output 540 of layer 0 of the neural network 310 is stored in buffer 422 and the overlap data 542 from the previous execution of layer 1 of the neural network 310 is stored in the line store 406. To prepare and process the data for layer 1, a vertical composer 530 can obtain the output 540 of layer 0 from the buffer 422 and the overlap data 542 from the line store 406 and generate the data 544 for layer 1 of the neural network 310. To generate the data 544, the vertical composer 530 can combine the output 540 and the overlap data 542. In some examples, the data 544 can include an input formulated for layer 1.

The data 544 can be processed through the MAC datapath 532 to generate the output 548 of layer 1. In some examples, the output 548 can include a block of data corresponding to a stripe block in a row of the stripe. The block of data can include data from a horizontal position in the row of the stripe and along a depth dimension of a stripe block. In other examples, the output 548 can include the data output of layer 1 corresponding to a row of the stripe.

The output 548 of layer 1 can then be stored in the buffer 424 on the scratch memory 420 for use by layer 2. In some examples, the MAC datapath 532 can include a MAC array and can perform a matrix multiply operation to generate the output 548. In some cases, the MAC datapath 532 can use a convolutional kernel of layer 1 to generate the output 548. For example, the convolutional kernel can convolve the data to generate the output 548.

The line store update component 534 can obtain the data 544 generated by the vertical composer 530 to generate overlap data 546 for the next row of layer 1. The line store update component 534 can then store the overlap data 546 in the line store 406 associated with layer 1. In some examples, the vertical composer 530 can determine and/or cut a portion of the data 544 to generate the overlap data 546. In some cases, the vertical composer 530 can determine and/or cut a bottom portion of the data 544 to generate the overlap data 546. The data processing architecture 500 can then use the overlap data 546 in the line store 408 from the previous time layer 2 was executed and the output 548 in the buffer 424 to prepare and process the data for layer 2.

In some examples, the data processing architecture 500 can optionally include a horizontal composer 560 for adding horizontal overlap data 550 to the data 544 generated by the vertical composer 530. For example, with reference to FIG. 5B, the horizontal composer 560 can obtain the data 544 from the vertical composer 530 and add the horizontal overlap data 550 to the data 544 to generate a block input 552 for the MAC array 562. The block input 552 can be used as the MAC array input to the MAC array 562. The block input 552 can include the data 544 and the horizontal overlap data 550 added or appended to a horizontal edge of the data 544.

In some examples, the horizontal overlap data 550 can pad the data 544 with data in the horizontal direction (e.g., the horizontal overlap data 550) prior to the data 544 being processed by the MAC array 562. In some cases, by adding the horizontal overlap data 550 to the data 544, the data processing architecture 500 can reduce the overall bandwidth used by the data processing architecture 500 and the data processing scheme 300. In some examples, the horizontal overlap data 550 can include a subset of data from a previous horizontal location processed in the same row of the stripe as the data 544.

The MAC array 562 can use the block input 552 to generate the output 548, which can be stored in the buffer 424 as previously described. In some examples, the MAC array 562 can perform a matric multiply operation to generate the output 548. In some cases, the horizontal composer 560 can implement an IM2COL operation on the data 544 and the horizontal overlap data 550 to generate the block input 552.

Figure 5B:
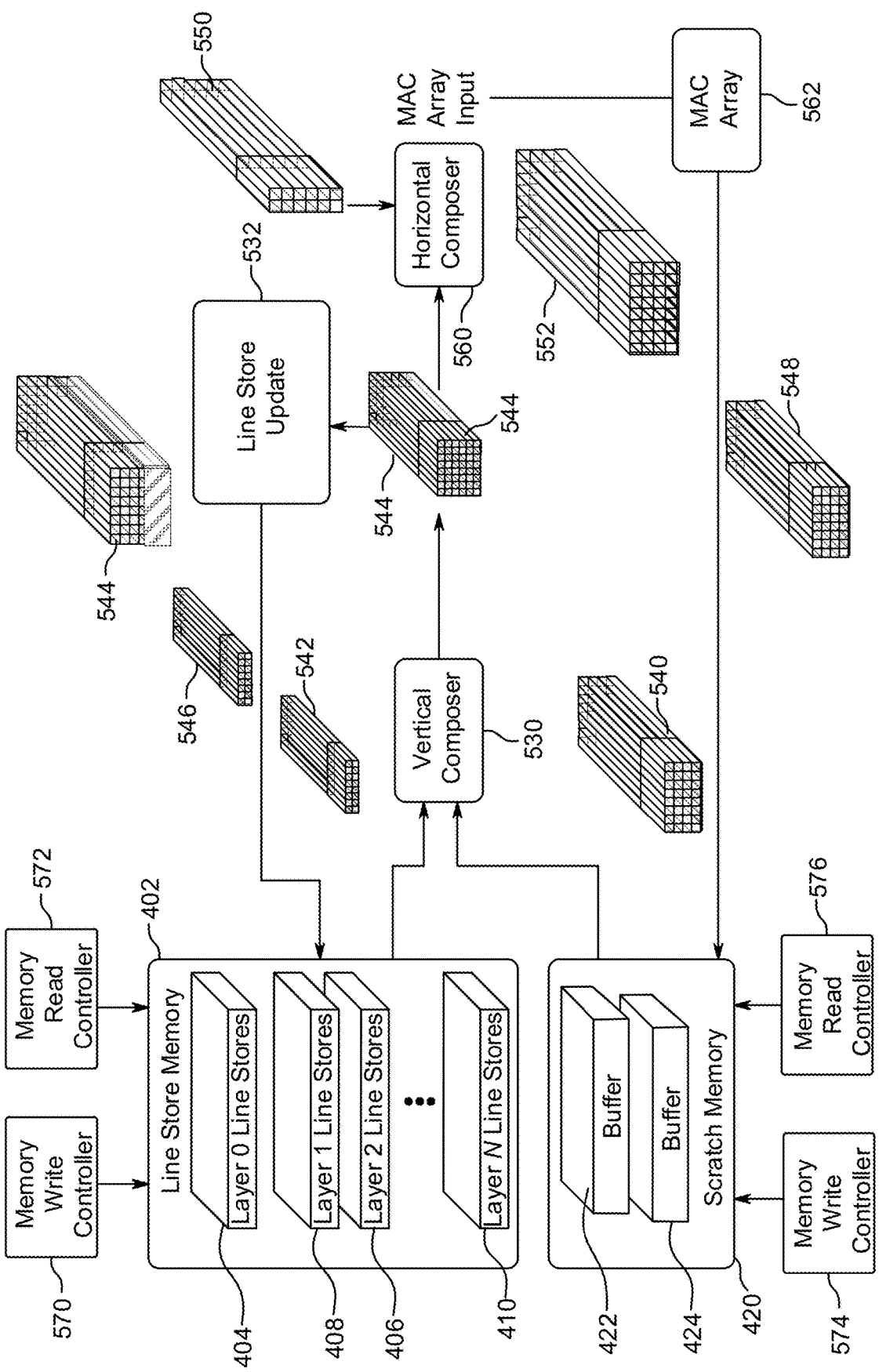

As shown in FIG. 5B, the data processing architecture 500 can include a write controller 570 for storing the data in the line store memory 402, and a read controller 572 for reading/retrieving data from the line store memory 402. Similarly, the data processing architecture 500 can include a write controller 574 for storing the data in the scratch memory 420, and a read controller 576 for reading/retrieving data from the scratch memory 420.

Figure 6:
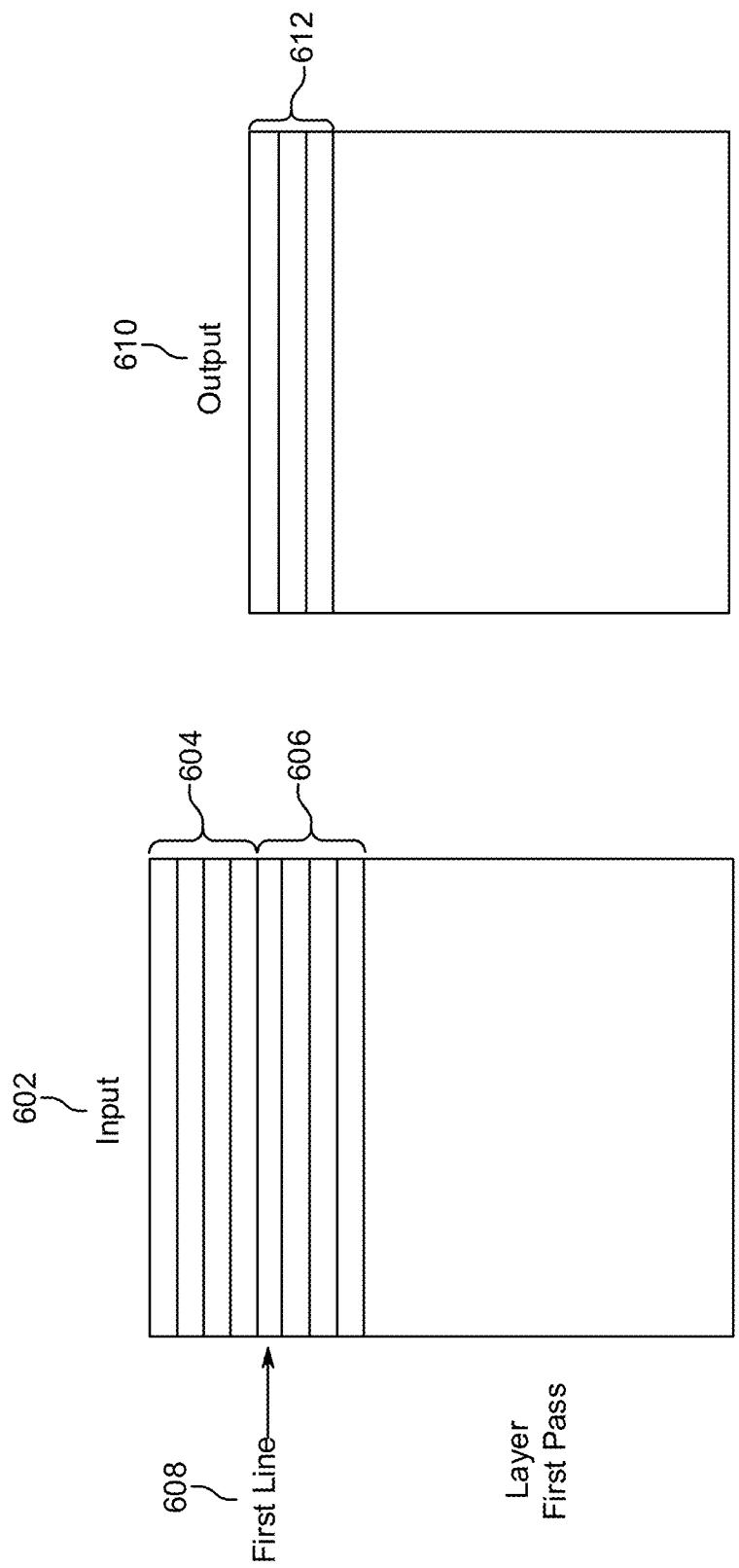
FIG. 6 is a diagram illustrating an example of a layer input padded with a vertical line offset and used to generate a layer output, in accordance with some examples of the present disclosure.

FIG. 6 is a diagram illustrating an example of a layer input 602 padded with a vertical line offset and used to generate a layer output 610. In this example, the layer input 602 corresponds to a first pass of a particular neural network layer. The layer input 602 includes input lines 606 and padding 604. In some examples, the input lines 606 can include data retrieved from the scratch memory 420, such as a layer output stored in a buffer in the scratch memory 420.

In some cases, the padding 604 can be added before and/or on top of the first line 608 of the input lines 606. The padding 604 can provide a vertical line offset. In some examples, the vertical line offset can be used to increase the size of the layer input to account for shifts and/or downscaling caused by convolutional filters as previously explained. In some cases, the padding 604 can include overlap data retrieved from the line store memory 402. The overlap data can include one or more vertical lines from a previous stripe row processed by the layer.

In some cases, if the layer associated with the layer input 602 is layer 0 (e.g., layer 312) and overlap data from previous processing is not available, the padding 604 can include repeated lines and/or values used to pad the layer input 602. For example, the padding 604 can include the first line 608 and/or one or more other lines from the input lines 606.

The layer input 602 can be used to generate the layer output 610. The layer output 610 can include output lines 612. In some examples, the output lines 612 can be stored in a buffer of the scratch memory 420 for use to formulate the input for a next neural network layer.

As illustrated in FIG. 6, the layer input 602 is larger than the layer output 610. In some examples, the convolutions in the neural network layer can cause a shift and/or reduction in the data. The shift and/or reduction in the data can cause the layer output 610 to be smaller than the layer input 602. Thus, when the layer output 610 is used to generate the input for a next layer, a similar padding (e.g., padding 604) of the layer output 610 can be used to increase the size of the input to the next layer. In some cases, overlap data (e.g., one or more vertical lines from a previous layer and/or row) can be used for the padding of the layer output 610.

Figure 7:
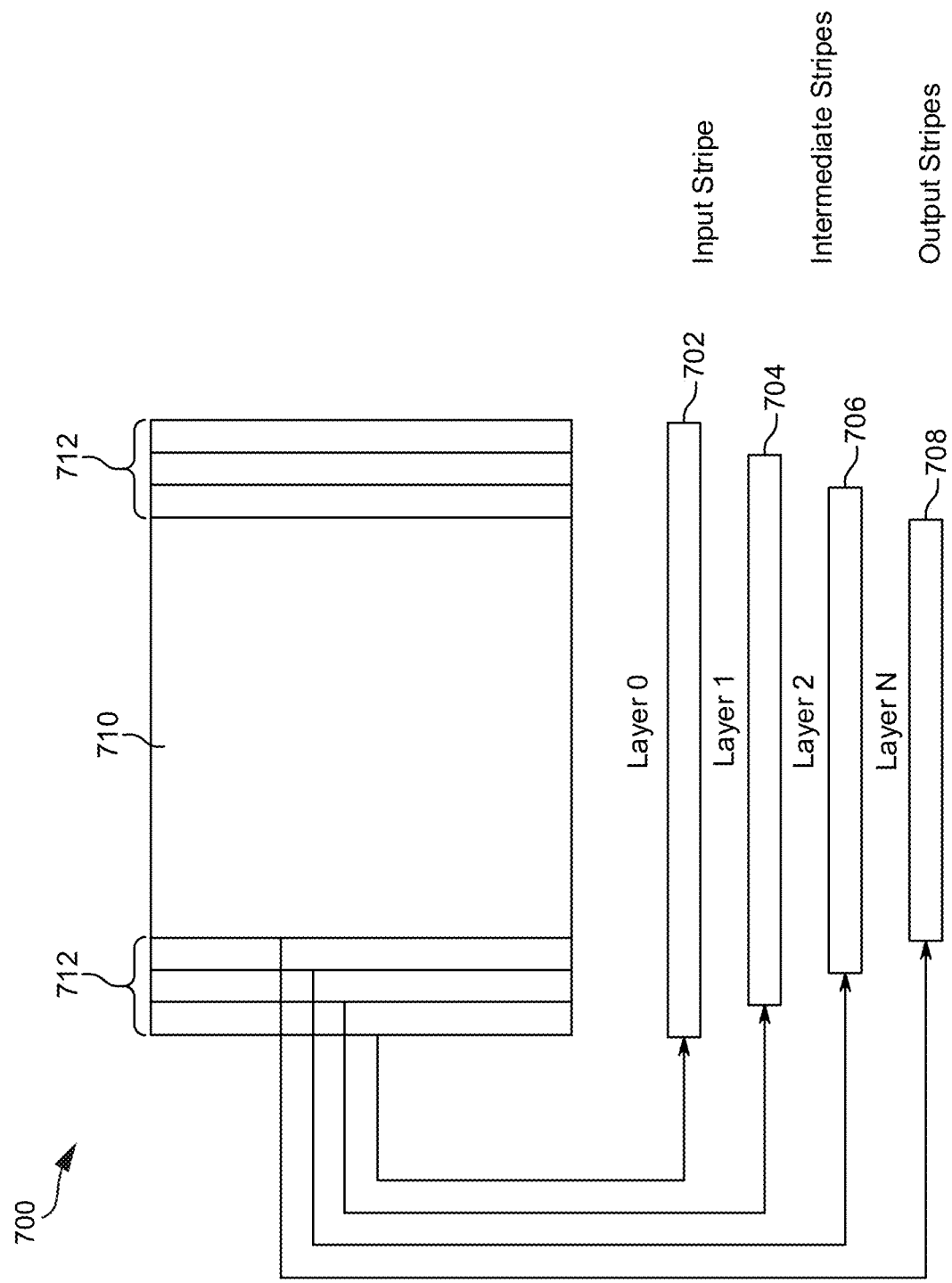
FIG. 7 is a diagram illustrating an example funnel processing scheme for reducing redundant calculations when processing stripes, in accordance with some examples of the present disclosure.

FIG. 7 is a diagram illustrating an example funnel processing scheme 700 for reducing redundant calculations when processing stripes. In this example, a central stripe 710 includes horizontal overlaps 712 on each side of the central stripe 710. The horizontal overlaps 712 are used to generate an output stripe 708 corresponding to the central stripe 710. In this example, the output stripe 708 is generated using layers 0 through N. The neural network (e.g., neural network 310) can process the stripe data layer-by-layer through layers 0 through N.

The horizontal overlaps 712 can increase the number of operations performed by the neural network (and/or the layers of the neural network) and the burden on system resources such as bandwidth, memory, power, and/or compute, which can increase with each additional layer implemented by the neural network. In some examples, the more layers implemented by the neural network, the greater the burden on resources and the number of redundant operations performed by the layers of the neural network.

The funnel processing scheme 700 can reduce the resource burden and the redundant calculations by progressively reducing the active stripe width as the neural network proceeds layer-by-layer. In some examples, the funnel processing scheme 700 can also reduce the number of MACs per layer.

The funnel processing scheme 700 can first generate an input stripe 702 for layer 0. As illustrated in FIG. 7, the input scope of the input stripe 702 for layer 0 is larger than the input scope for layers 1, 2, and N. For example, when progressing from layer 0 to layer 1, the funnel processing scheme 700 can reduce the input scope of the intermediate stripe 704 for layer 1 relative to the input scope of the input stripe 702 for layer 0. Similarly, the funnel processing scheme 700 can reduce the input scope of the intermediate stripe 706 for layer 2 relative to the input scope of the intermediate stripe 704 for layer 1. The funnel processing scheme 700 can further reduce the input scope for the output stripe 708 at layer N relative to the input scope of the intermediate stripe 706 for layer 2.

In this way, the funnel processing scheme 700 can progressively reduce the input scope for each layer of the neural network, as well as the redundant calculations used to generate the output stripe 708. The reduction in calculations and processed data can reduce the burden on resources such as memory, compute, power, bandwidth, etc.

Figure 8:
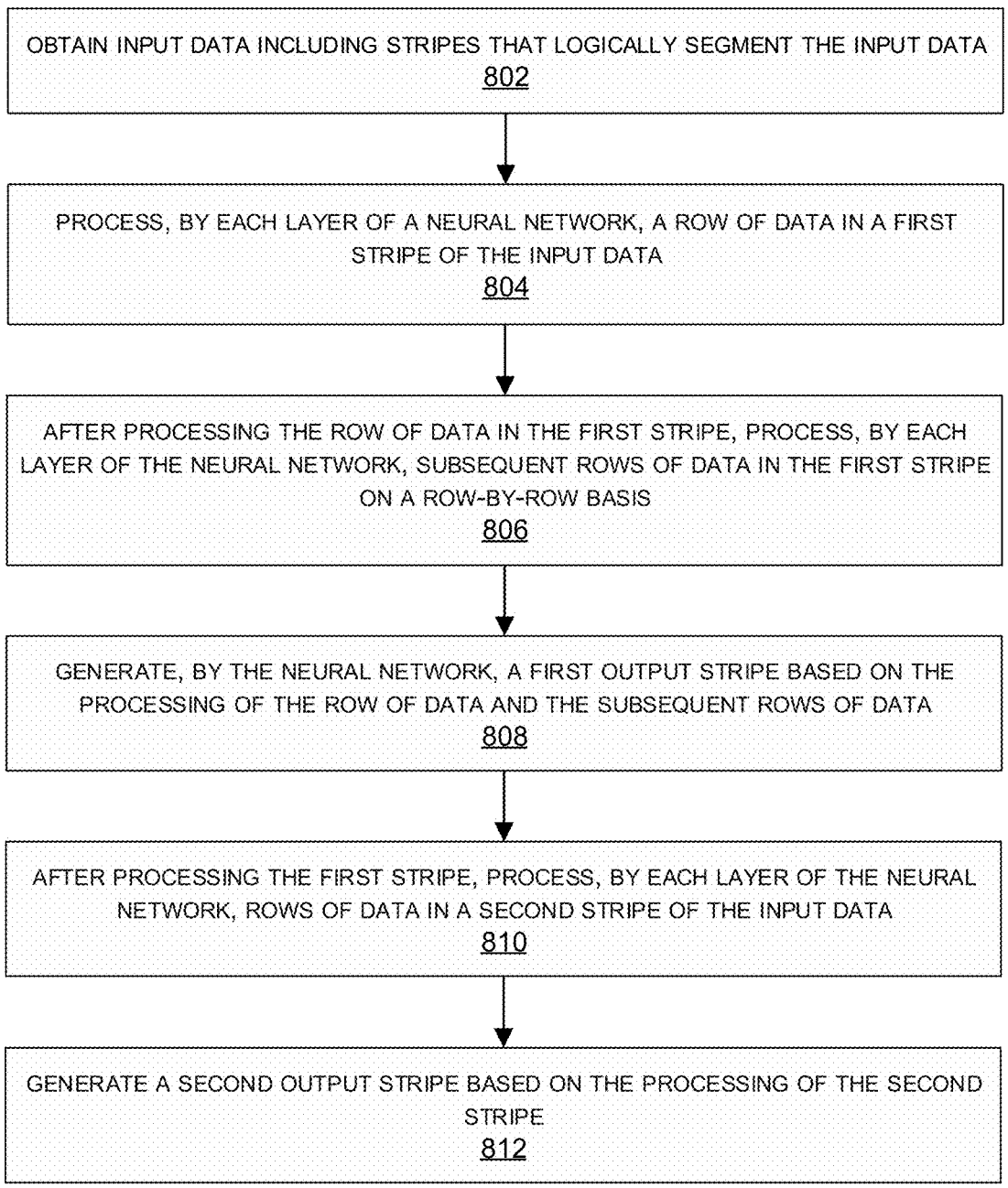
FIG. 8 is a flowchart illustrating an example process for processing data in a neural network, in accordance with some examples of the present disclosure.

FIG. 8 is a flowchart illustrating an example process 800 for processing data in a neural network, in accordance with some examples of the present disclosure. At block 802, the process 800 can include obtaining input data (e.g., input 200) including stripes (e.g., stripe 210A, stripe 210B) that logically segment the input data. Each stripe of the input data includes at least one row of data, such as the stripe 210A shown in FIG. 2. In some examples, the process 800 can include logically segmenting the input data into the stripes. In some cases, each stripe can include a respective portion of the input data.

At block 804, the process 800 can include processing, by each layer (e.g., layer 312, layer 314, layer 316, layer 318) of a neural network (e.g., neural network 310), a row of data (e.g., row 306A) in a first stripe (e.g., stripe 210A) of the input data. In some examples, the row of data can be processed sequentially in a horizontal direction (e.g., horizontal dimension 202) and according to a layer-by-layer sequence where each preceding layer of the neural network processes a particular row (e.g., the row of data in the first stripe, such as row 306A in stripe 210A) of data before each subsequent layer of the neural network.

In some cases, processing the row of data sequentially in the horizontal direction can include sequentially processing, by each layer of the neural network, a plurality of blocks of data (e.g., stripe blocks 302) in the row. In some cases, each layer of the neural network can process each preceding block of data along a depth direction (e.g., depth dimension 206) before processing a subsequent block along the horizontal direction (e.g., horizontal dimension 202).

In some cases, the neural network can include a convolutional neural network. In some examples, the neural network can include a pixel-to-pixel neural network, and the input data can include pixels associated with an image. In other cases, the neural network can include a neural network that processes 2D data inputs to 2D data outputs and/or 3D data inputs to 3D data outputs.

In some examples, processing the row of data according to the layer-by-layer sequence can include processing, by each subsequent layer of the neural network, an output of the preceding layer of the neural network. In some examples, the output can correspond to the row of data.

At block 806, the process 800 can include processing, by each layer of the neural network and after processing the row of data in the first stripe, subsequent rows of data (e.g., row 306B, row 306N) in the first stripe on a row-by-row basis. In some examples, each subsequent row of data can be processed sequentially in the horizontal direction and according to the layer-by-layer sequence (e.g., each preceding layer of the neural network processes the subsequent row before each subsequent layer of the neural network).

In some cases, processing the subsequent rows can include sequentially processing, by each layer of the neural network, a respective plurality of blocks of data (e.g., stripe blocks 302) in each subsequent row. In some cases, each layer of the neural network can process preceding blocks of data in a subsequent row in the first stripe along the depth direction before processing subsequent blocks of data in the subsequent row.

In some cases, processing the subsequent rows of data according to the layer-by-layer sequence can include processing, by each subsequent layer of the neural network, an output of the preceding layer of the neural network. In some examples, the output can correspond to the subsequent row of data.

At block 808, the process 800 can include generating, by the neural network, a first output stripe based on the processing of the row of data and the subsequent rows of data.

At block 810, the process 800 can include processing, by each layer of the neural network and after processing the first stripe, rows of data in a second stripe (e.g., stripe 210B) of the input data. In some examples, the rows of data in the second stripe can be processed on a row-by-row basis. In some examples, each row of data in the second stripe can be processed in the horizontal direction and according to the layer-by-layer sequence.

At block 812, the process 800 can include generating a second output stripe based on the processing of the second stripe. In some examples, the neural network can generate an output for the input data based on the first output stripe and/or the second output stripe.

In some cases, the process 800 can include storing, in a first memory (e.g., scratch memory 420), an output (e.g., output 548) generated by a previous layer of the neural network for one or more blocks (e.g., stripe blocks 302) in the row of data; and storing, in a second memory (e.g., line store memory 402) associated with the particular layer of the neural network, one or more lines of data from the one or more blocks in the row of data. In some examples, the one or more lines of data can include a portion of a data input of the particular layer of the neural network on a previous stripe-block-row (e.g., overlap data 542, overlap data 546).

In some examples, the process 800 can include generating an input (e.g., input 452, block input 552) for the particular layer of the neural network based on a combination of the output generated by the previous layer and the one or more lines of data including the portion of the data input to this same layer on the previous stripe-row. The process 800 can include generating, by the particular layer of the neural network, an additional output based on the input for the previous layer.

In some examples, the process 800 can include determining and/or cutting a portion of the input for the particular layer (e.g., overlap data 542, overlap data 546). The process 800 can include storing the portion of the input in a third memory (e.g., line store memory 402) associated with the particular layer of the neural network.

In some cases, the process 800 can include generating an additional input for the subsequent layer of the neural network based on a combination of the additional output of the particular layer and the portion of the input from the previous block-row of the subsequent layer. The process 800 can include generating, by the subsequent layer of the neural network, a second additional output based on the additional input for the subsequent layer.

In some cases, the process 800 can include storing the second additional output in fourth memory (e.g., scratch memory 420). In some examples, the second memory and the third memory can include line stores (e.g., line store 404, line store 406, line store 408, line store 410) in a line store memory (e.g., line store memory 402), and the first memory and the fourth memory can include buffers (e.g., buffer 422, buffer 424) in scratch memory (e.g., scratch memory 420).

In some cases, the process 800 can include storing, in a first memory (e.g., scratch memory 420) associated with a particular layer of the neural network, outputs generated by a previous layer of the neural network for one or more blocks in each subsequent row of data. The process 800 can include storing, in a second memory (e.g., line store memory 402), one or more lines of data from the one or more blocks in each subsequent row of data. In some examples, the one or more lines of data can include one or more portions of one or more data inputs of the particular layer of the neural network.

In some cases, the process 800 can include generating inputs for the particular layer of the neural network based on combinations of the outputs generated by the previous layer and the one or more lines of data including the one or more portions of the one or more data inputs of the particular layer for a previous stripe-block-row. The process 800 can include generating, by the particular layer of the neural network, additional outputs based on the inputs for the outputs from the previous layer and a subset of inputs from the particular layer on the previous stripe-block-row.

In some cases, the process 800 can include determining and/or cutting portions of the inputs for the particular layer. The process 800 can include storing the portions of the inputs in a third memory (e.g., line store memory 402) associated with a subsequent layer of the neural network. The process 800 can further include storing the additional outputs in a fourth memory (e.g., scratch memory 420). In some examples, the second memory and the fourth memory can include memory buffers (e.g., buffer 422, buffer 424).

In some examples, the processes described herein (e.g., process 800, and/or any other process described herein) may be performed by a computing device or apparatus. In one example, the process 800 can be performed by the computing system 100 of FIG. 1. In another example, the process 800 can be performed by the computing system having the computing device architecture 900 shown in FIG. 9. For instance, a computing device with the computing device architecture 900 shown in FIG. 9 can implement the operations of FIG. 8 and/or the components and/or operations described herein with respect to any of FIGS. 1 through 8.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a laptop computer, a smart television, a camera, and/or any other computing device with the resource capabilities to perform the processes described herein, including the process 800 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
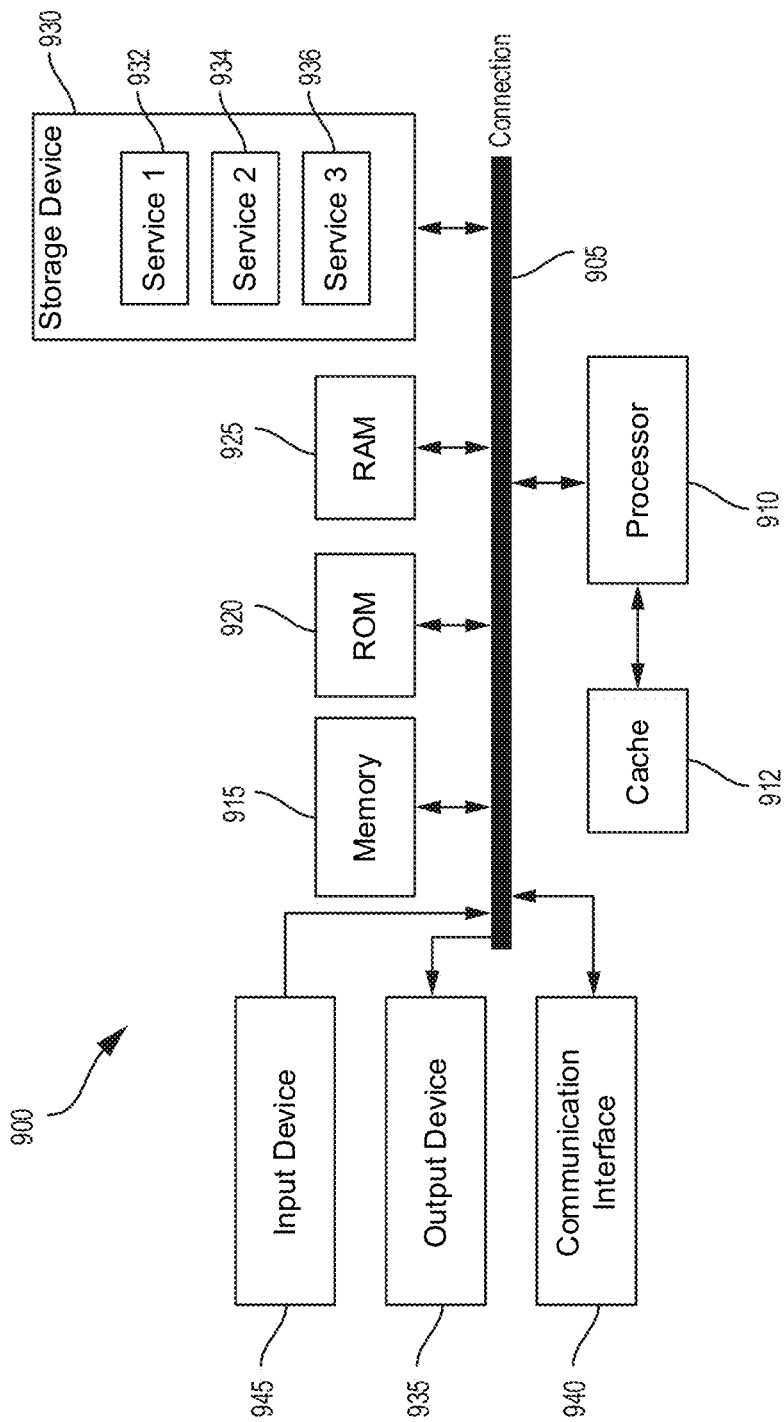
FIG. 9 is a diagram illustrating an example system architecture for implementing certain aspects described herein.

FIG. 9 illustrates an example computing device architecture 900 of an example computing device which can implement various techniques described herein. For example, the computing device architecture 900 can implement at least some portions of the computing system 100 shown in FIG. 1. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service (e.g., service 1 932, service 2 934, and service 3 936) stored in storage device 930 and configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device. In some instances, multimodal computing devices can enable a user to provide multiple types of input to communicate with the computing device architecture 900. The communication interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include service 932, service 934, and service 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: An apparatus comprising memory and one or more processors coupled to the memory, the one or more processors being configured to: obtain input data comprising stripes that logically segment the input data, each stripe of the input data including at least one row of data; process, by each layer of a neural network, a row of data in a first stripe of the input data, wherein the row of data is processed sequentially in a horizontal direction and according to a layer-by-layer sequence where each preceding layer of the neural network processes a particular row of data before each subsequent layer of the neural network; after processing the row of data in the first stripe, process, by each layer of the neural network, subsequent rows of data in the first stripe on a row-by-row basis, wherein each subsequent row of data is processed sequentially in the horizontal direction and according to the layer-by-layer sequence; generate, by the neural network, a first output stripe based on the processing of the row of data and the subsequent rows of data; after processing the first stripe, process, by each layer of the neural network, rows of data in a second stripe of the input data on a row-by-row basis, wherein each row of data in the second stripe is processed in the horizontal direction and according to the layer-by-layer sequence; and generate a second output stripe based on the processing of the second stripe.

Aspect 2: The apparatus of Aspect 1, wherein, to process the row of data in the first stripe sequentially in the horizontal direction, the one or more processors are configured to: sequentially process, by each layer of the neural network, a plurality of blocks of data in the row, wherein each layer of the neural network processes each preceding block of data along a depth direction before processing a subsequent block along the horizontal direction.

Aspect 3: The apparatus of Aspect 2, wherein, to process the subsequent rows, the one or more processors are configured to: sequentially process, by each layer of the neural network, a respective plurality of blocks of data in each subsequent row, wherein each layer of the neural network processes preceding blocks of data in a subsequent row along the depth direction before processing subsequent blocks of data in the subsequent row.

Aspect 4: The apparatus of any of Aspects 1 to 3, wherein the neural network comprises a pixel-to-pixel neural network, and wherein the input data comprises pixels associated with an image.

Aspect 5: The apparatus of any of Aspects 1 to 4, wherein, to obtain the input data, the one or more processors are configured to: logically segment the input data into the stripes, wherein each stripe comprises a respective portion of the input data.

Aspect 6: The apparatus of any of Aspects 1 to 5, wherein the one or more processors are configured to: store, in a first memory, an output generated by a previous layer of the neural network for one or more blocks in the row of data in the first stripe; and store, in a second memory associated with a particular layer of the neural network, one or more lines of data from the one or more blocks in the row of data, wherein the one or more lines of data comprise a portion of a data input of the particular layer of the neural network on a previous stripe-block-row.

Aspect 7: The apparatus of Aspect 6, wherein the one or more processors are configured to: generate an input for the particular layer of the neural network based on a combination of the output generated by the previous layer and the one or more lines of data comprising the portion of the data input of the particular layer on the previous stripe-block-row; and generate, by the particular layer of the neural network, an additional output based on the output for the previous layer.

Aspect 8: The apparatus of Aspect 7, wherein the one or more processors are configured to: determine a portion of the input for the particular layer; and store the portion of the input in a third memory associated with the particular layer of the neural network.

Aspect 9: The apparatus of Aspect 8, wherein the one or more processors are configured to: generate an additional input for the subsequent layer of the neural network based on a combination of the additional output of the particular layer and the portion of the input for a subsequent layer from a previous stripe-block-row of the subsequent layer; and generate, by the subsequent layer of the neural network, a second additional output based on the additional input for the subsequent layer.

Aspect 10: The apparatus of Aspect 9, wherein the one or more processors are configured to: store the second additional output in fourth memory, wherein the second memory and the third memory comprise line stores in a line store memory, and wherein the first memory and the fourth memory comprise buffers in scratch memory.

Aspect 11: The apparatus of any of Aspects 1 to 10, wherein the one or more processors are configured to: store, in a first memory associated with a particular layer of the neural network, outputs generated by a previous layer of the neural network for one or more blocks in each subsequent row of data; and store, in a second memory, one or more lines of data from the one or more blocks in each subsequent row of data, wherein the one or more lines of data comprise one or more portions of one or more data inputs of the particular layer of the neural network.

Aspect 12: The apparatus of Aspect 11, wherein the one or more processors are configured to: generate inputs for the particular layer of the neural network based on combinations of the outputs generated by the previous layer and the one or more lines of data comprising the one or more portions of the one or more data inputs of the particular layer for a previous stripe-block-row; and generate, by the particular layer of the neural network, additional outputs based on the outputs from the previous layer and a subset of the inputs from the particular layer on the previous stripe-block-row.

Aspect 13: The apparatus of Aspect 12, wherein the one or more processors are configured to: determine portions of the inputs for the particular layer; store the portions of the inputs in a third memory associated with a subsequent layer of the neural network; and store the additional outputs in a fourth memory, wherein the second memory and the fourth memory comprise memory buffers.

Aspect 14: The apparatus of any of Aspects 1 to 13, wherein, to process the row of data, the one or more processors are configured to: process, by each subsequent layer of the neural network, an output of a preceding layer of the neural network, the output corresponding to the row of data.

Aspect 15: The apparatus of any of Aspects 1 to 14, wherein, to process the subsequent rows of data, the one or more processors are configured to: process, by each subsequent layer of the neural network, an output of a preceding layer of the neural network, the output corresponding to a subsequent row of data in the first stripe.

Aspect 16: The apparatus of any of Aspects 1 to 15, wherein the apparatus comprises a camera device.

Aspect 17: The apparatus of any of Aspects 1 to 16, wherein the apparatus comprises a mobile device.

Aspect 18: A method comprising: obtaining input data comprising stripes that logically segment the input data, each stripe of the input data including at least one row of data; processing, by each layer of a neural network, a row of data in a first stripe of the input data, wherein the row of data is processed sequentially in a horizontal direction and according to a layer-by-layer sequence where each preceding layer of the neural network processes a particular row of data before each subsequent layer of the neural network;

after processing the row of data in the first stripe, processing, by each layer of the neural network, subsequent rows of data in the first stripe on a row-by-row basis, wherein each subsequent row of data is processed sequentially in the horizontal direction and according to the layer-by-layer sequence; generating, by the neural network, a first output stripe based on the processing of the row of data and the subsequent rows of data; after processing the first stripe, processing, by each layer of the neural network, rows of data in a second stripe of the input data on a row-by-row basis, wherein each row of data in the second stripe is processed in the horizontal direction and according to the layer-by-layer sequence; and generating a second output stripe based on the processing of the second stripe.

Aspect 19: The method of Aspect 18, wherein processing the row of data in the first stripe sequentially in the horizontal direction comprises: sequentially processing, by each layer of the neural network, a plurality of blocks of data in the row, wherein each layer of the neural network processes each preceding block of data along a depth direction before processing a subsequent block along the horizontal direction.

Aspect 20: The method of Aspect 19, wherein processing the subsequent rows comprises: sequentially processing, by each layer of the neural network, a respective plurality of blocks of data in each subsequent row, wherein each layer of the neural network processes preceding blocks of data in a subsequent row along the depth direction before processing subsequent blocks of data in the subsequent row.

Aspect 21: The method of any of Aspects 18 to 20, wherein the neural network comprises a pixel-to-pixel neural network, and wherein the input data comprises pixels associated with an image.

Aspect 22: The method of any of Aspects 18 to 21, wherein obtaining the input data comprises: logically segmenting the input data into the stripes, wherein each stripe comprises a respective portion of the input data.

Aspect 23: The method of any of Aspects 18 to 22, further comprising: storing, in a first memory, an output generated by a previous layer of the neural network for one or more blocks in the row of data in the first stripe; and storing, in a second memory associated with a particular layer of the neural network, one or more lines of data from the one or more blocks in the row of data, wherein the one or more lines of data comprise a portion of a data input of the particular layer of the neural network on a previous stripe-block-row.

Aspect 24: The method of Aspect 23, further comprising: generating an input for the particular layer of the neural network based on a combination of the output generated by the previous layer and the one or more lines of data comprising the portion of the data input of the particular layer on the previous stripe-block-row; and generating, by the particular layer of the neural network, an additional output based on the output for the previous layer.

Aspect 25: The method of Aspect 24, further comprising: determining a portion of the input for the particular layer; and storing the portion of the input in a third memory associated with the particular layer of the neural network.

Aspect 26: The method of Aspect 25, further comprising: generating an additional input for the subsequent layer of the neural network based on a combination of the additional output of the particular layer and the portion of the input for a subsequent layer from a previous stripe-block-row of the subsequent layer; and generating, by the subsequent layer of the neural network, a second additional output based on the additional input for the subsequent layer.

Aspect 27: The method of Aspect 26, further comprising: storing the second additional output in fourth memory, wherein the second memory and the third memory comprise line stores in a line store memory, and wherein the first memory and the fourth memory comprise buffers in scratch memory.

Aspect 28: The method of any of Aspects 18 to 27, further comprising: storing, in a first memory associated with a particular layer of the neural network, outputs generated by a previous layer of the neural network for one or more blocks in each subsequent row of data; and storing, in a second memory, one or more lines of data from the one or more blocks in each subsequent row of data, wherein the one or more lines of data comprise one or more portions of one or more data inputs of the particular layer of the neural network.

Aspect 29: The method of Aspect 28, further comprising: generating inputs for the particular layer of the neural network based on combinations of the outputs generated by the previous layer and the one or more lines of data comprising the one or more portions of the one or more data inputs of the particular layer for a previous stripe-block-row; and generating, by the particular layer of the neural network, additional outputs based on the outputs from the previous layer and a subset of the inputs from the particular layer on the previous stripe-block-row.

Aspect 30: The method of Aspect 29, further comprising: determine portions of the inputs for the particular layer; storing the portions of the inputs in a third memory associated with a subsequent layer of the neural network; and storing the additional outputs in a fourth memory, wherein the second memory and the fourth memory comprise memory buffers.

Aspect 31: The method of any of Aspects 18 to 30, wherein processing the row of data comprises: processing, by each subsequent layer of the neural network, an output of a preceding layer of the neural network, the output corresponding to the row of data.

Aspect 32: The method of any of Aspects 18 to 31, wherein processing the subsequent rows of data comprises: processing, by each subsequent layer of the neural network, an output of a preceding layer of the neural network, the output corresponding to a subsequent row of data in the first stripe.

Aspect 33: A non-transitory computer-readable medium having stored thereon instructions which, when executed by one or more processors, cause the one or more processors to perform a method according to any of Aspects 18 to 32.

Aspect 34: An apparatus comprising means for performing a method according to any of Aspects 18 to 32.

What is claimed is:

1. An apparatus comprising:
   memory; and
   one or more processors coupled to the memory, the one or more processors being configured to:
      obtain input data comprising stripes that logically segment the input data, each stripe of the input data including at least one row of data;
      process, by each layer of a neural network, a row of data in a first stripe of the input data, wherein the row of data is processed sequentially in a horizontal direction and according to a layer-by-layer sequence where each preceding layer of the neural network processes a particular row of data before each subsequent layer of the neural network, wherein an input is generated for a particular layer of the neural network based on a combination of a stored output generated by a previous layer of the neural network for one or more blocks in the row of data in the first stripe and one or more stored lines of data from the one or more blocks in the row of data in the first stripe, and wherein an additional output is generated by the particular layer of the neural network based on the output generated by the previous layer for processing by a subsequent layer of the neural network;

after processing the row of data in the first stripe, process, by each layer of the neural network, subsequent rows of data in the first stripe on a row-by-row basis, wherein each subsequent row of data is processed sequentially in the horizontal direction and according to the layer-by-layer sequence;

generate, by the neural network, a first output stripe based on the processing of the row of data and the subsequent rows of data;

after processing the first stripe, process, by each layer of the neural network, rows of data in a second stripe of the input data on a row-by-row basis, wherein each row of data in the second stripe is processed in the horizontal direction and according to the layer-by-layer sequence; and generate a second output stripe based on the processing of the second stripe.

2. The apparatus of claim 1, wherein, to process the row of data in the first stripe sequentially in the horizontal direction, the one or more processors are configured to:
sequentially process, by each layer of the neural network, a plurality of blocks of data in the row, wherein each layer of the neural network processes each preceding block of data along a depth direction before processing a subsequent block along the horizontal direction.

3. The apparatus of claim 2, wherein, to process the subsequent rows, the one or more processors are configured to:
sequentially process, by each layer of the neural network, a respective plurality of blocks of data in each subsequent row, wherein each layer of the neural network processes preceding blocks of data in a subsequent row along the depth direction before processing subsequent blocks of data in the subsequent row.

4. The apparatus of claim 1, wherein the neural network comprises a pixel-to-pixel neural network, and wherein the input data comprises pixels associated with an image.

5. The apparatus of claim 1, wherein, to obtain the input data, the one or more processors are configured to:
logically segment the input data into the stripes, wherein each stripe comprises a respective portion of the input data.

6. The apparatus of claim 1, wherein the one or more processors are configured to:
store, in a first memory, the output generated by the previous layer of the neural network for the one or more blocks in the row of data in the first stripe; and
store, in a second memory associated with the particular layer of the neural network, the one or more lines of data from the one or more blocks in the row of data, wherein the one or more lines of data comprise a portion of a data input of the particular layer of the neural network on a previous stripe-block-row.

7. The apparatus of claim 6, wherein the one or more processors are configured to:
determine a portion of the input for the particular layer; and
store the portion of the input in a third memory associated with the particular layer of the neural network.

8. The apparatus of claim 7, wherein the one or more processors are configured to:
generate an additional input for the subsequent layer of the neural network based on a combination of the additional output of the particular layer and the portion of the input for a subsequent layer from a previous stripe-block-row of the subsequent layer; and
generate, by the subsequent layer of the neural network, a second additional output based on the additional input for the subsequent layer.

9. The apparatus of claim 8, wherein the one or more processors are configured to:
store the second additional output in fourth memory, wherein the second memory and the third memory comprise line stores in a line store memory, and wherein the first memory and the fourth memory comprise buffers in scratch memory.

10. The apparatus of claim 1, wherein the one or more processors are configured to:
store, in a first memory associated with a particular layer of the neural network, outputs generated by a previous layer of the neural network for one or more blocks in each subsequent row of data; and
store, in a second memory, one or more lines of data from the one or more blocks in each subsequent row of data, wherein the one or more lines of data comprise one or more portions of one or more data inputs of the particular layer of the neural network.

11. The apparatus of claim 10, wherein the one or more processors are configured to:
generate inputs for the particular layer of the neural network based on combinations of the outputs generated by the previous layer and the one or more lines of data comprising the one or more portions of the one or more data inputs of the particular layer for a previous stripe-block-row; and
generate, by the particular layer of the neural network, additional outputs based on the outputs from the previous layer and a subset of the inputs from the particular layer on the previous stripe-block-row.

12. The apparatus of claim 11, wherein the one or more processors are configured to:
determine portions of the inputs for the particular layer;
store the portions of the inputs in a third memory associated with a subsequent layer of the neural network; and
store the additional outputs in a fourth memory, wherein the second memory and the fourth memory comprise memory buffers.

13. The apparatus of claim 1, wherein, to process the row of data, the one or more processors are configured to:
process, by each subsequent layer of the neural network, an output of a preceding layer of the neural network, the output corresponding to the row of data.

14. The apparatus of claim 1, wherein, to process the subsequent rows of data, the one or more processors are configured to:
process, by each subsequent layer of the neural network, an output of a preceding layer of the neural network, the output corresponding to a subsequent row of data in the first stripe.

15. The apparatus of claim 1, wherein the apparatus comprises a camera device.

16. The apparatus of claim 1, wherein the apparatus comprises a mobile device.

17. A method comprising:
obtaining input data comprising stripes that logically segment the input data, each stripe of the input data including at least one row of data;
processing, by each layer of a neural network, a row of data in a first stripe of the input data, wherein the row of data is processed sequentially in a horizontal direction and according to a layer-by-layer sequence where each preceding layer of the neural network processes a particular row of data before each subsequent layer of the neural network, wherein an input is generated for a particular layer of the neural network based on a combination of a stored output generated by a previous layer of the neural network for one or more blocks in the row of data in the first stripe and one or more stored lines of data from the one or more blocks in the row of data in the first stripe, and wherein an additional output is generated by the particular layer of the neural network based on the output generated by the previous layer for processing by a subsequent layer of the neural network;
after processing the row of data in the first stripe, processing, by each layer of the neural network, subsequent rows of data in the first stripe on a row-by-row basis, wherein each subsequent row of data is processed sequentially in the horizontal direction and according to the layer-by-layer sequence;
generating, by the neural network, a first output stripe based on the processing of the row of data and the subsequent rows of data;
after processing the first stripe, processing, by each layer of the neural network, rows of data in a second stripe of the input data on a row-by-row basis, wherein each row of data in the second stripe is processed in the horizontal direction and according to the layer-by-layer sequence; and
generating a second output stripe based on the processing of the second stripe.

18. The method of claim 17, wherein processing the row of data in the first stripe sequentially in the horizontal direction comprises:
sequentially processing, by each layer of the neural network, a plurality of blocks of data in the row, wherein each layer of the neural network processes each preceding block of data along a depth direction before processing a subsequent block along the horizontal direction.

19. The method of claim 18, wherein processing the subsequent rows comprises:
sequentially processing, by each layer of the neural network, a respective plurality of blocks of data in each subsequent row, wherein each layer of the neural network processes preceding blocks of data in a subsequent row along the depth direction before processing subsequent blocks of data in the subsequent row.

20. The method of claim 17, wherein the neural network comprises a pixel-to-pixel neural network, and wherein the input data comprises pixels associated with an image.

21. The method of claim 17, wherein obtaining the input data comprises:
logically segmenting the input data into the stripes, wherein each stripe comprises a respective portion of the input data.

22. The method of claim 17, further comprising:
storing, in a first memory, the output generated by the previous layer of the neural network for one or more blocks in the row of data in the first stripe; and
storing, in a second memory associated with the particular layer of the neural network, the one or more lines of data from the one or more blocks in the row of data, wherein the one or more lines of data comprise a portion of a data input of the particular layer of the neural network on a previous stripe-block-row.

23. The method of claim 22, further comprising:
determining a portion of the input for the particular layer; and
storing the portion of the input in a third memory associated with the particular layer of the neural network.

24. The method of claim 23, further comprising:
generating an additional input for the subsequent layer of the neural network based on a combination of the additional output of the particular layer and the portion of the input for a subsequent layer from a previous stripe-block-row of the subsequent layer; and
generating, by the subsequent layer of the neural network, a second additional output based on the additional input for the subsequent layer.

25. The method of claim 24, further comprising:
storing the second additional output in fourth memory, wherein the second memory and the third memory comprise line stores in a line store memory, and wherein the first memory and the fourth memory comprise buffers in scratch memory.

26. The method of claim 17, further comprising:
storing, in a first memory associated with a particular layer of the neural network, outputs generated by a previous layer of the neural network for one or more blocks in each subsequent row of data; and
storing, in a second memory, one or more lines of data from the one or more blocks in each subsequent row of data, wherein the one or more lines of data comprise one or more portions of one or more data inputs of the particular layer of the neural network.

27. The method of claim 26, further comprising:
generating inputs for the particular layer of the neural network based on combinations of the outputs generated by the previous layer and the one or more lines of data comprising the one or more portions of the one or more data inputs of the particular layer for a previous stripe-block-row; and
generating, by the particular layer of the neural network, additional outputs based on the outputs from the previous layer and a subset of the inputs from the particular layer on the previous stripe-block-row.

28. The method of claim 27, further comprising:
determine portions of the inputs for the particular layer;
storing the portions of the inputs in a third memory associated with a subsequent layer of the neural network; and
storing the additional outputs in a fourth memory, wherein the second memory and the fourth memory comprise memory buffers.

29. The method of claim 17, wherein processing the row of data comprises processing, by each subsequent layer of the neural network, an output of a preceding layer of the neural network, the output corresponding to the row of data, and wherein processing the subsequent rows of data comprises processing, by each subsequent layer of the neural network, an output of a preceding layer of the neural network, the output corresponding to a subsequent row of data in the first stripe.

30. A non-transitory computer-readable medium having stored thereon instructions which, when executed by one or more processors, cause the one or more processors to:

obtain input data comprising stripes that logically segment the input data, each stripe of the input data including at least one row of data;

process, by each layer of a neural network, a row of data in a first stripe of the input data, wherein the row of data is processed sequentially in a horizontal direction and according to a layer-by-layer sequence where each preceding layer of the neural network processes a particular row of data before each subsequent layer of the neural network, wherein an input is generated for a particular layer of the neural network based on a combination of a stored output generated by a previous layer of the neural network for one or more blocks in the row of data in the first stripe and one or more stored lines of data from the one or more blocks in the row of data in the first stripe, and wherein an additional output is generated by the particular layer of the neural network based on the output generated by the previous layer for processing by a subsequent layer of the neural network;

after processing the row of data in the first stripe, process, by each layer of the neural network, subsequent rows of data in the first stripe on a row-by-row basis, wherein each subsequent row of data is processed sequentially in the horizontal direction and according to the layer-by-layer sequence;

generate, by the neural network, a first output stripe based on the processing of the row of data and the subsequent rows of data;

after processing the first stripe, process, by each layer of the neural network, rows of data in a second stripe of the input data on a row-by-row basis, wherein each row of data in the second stripe is processed in the horizontal direction and according to the layer-by-layer sequence; and generate a second output stripe based on the processing of the second stripe.

* * * * *